United States Patent [19]
White et al.

[11] Patent Number: 5,400,269
[45] Date of Patent: Mar. 21, 1995

[54] CLOSED-LOOP BASEBAND CONTROLLER FOR A REBALANCE LOOP OF A QUARTZ ANGULAR RATE SENSOR

[75] Inventors: Stanley A. White, San Clemente; John C. Pinson, Anaheim, both of Calif.

[73] Assignee: Rockwell International Corporation, Seal Beach, Calif.

[21] Appl. No.: 124,176

[22] Filed: Sep. 20, 1993

[51] Int. Cl.$^6$ ............................................. G01N 27/10
[52] U.S. Cl. ..................................... 364/570; 364/565; 364/559; 73/1 F; 73/504; 73/505; 73/517 A; 318/600; 318/606
[58] Field of Search ................... 364/570, 565, 559; 332/123, 124, 159, 160; 73/1 E, 504, 505, 510, 517 A; 375/77, 12, 39, 14; 318/600–602, 606, 608

[56] References Cited

U.S. PATENT DOCUMENTS

| | | | |
|---|---|---|---|
| 4,343,759 | 8/1982 | Kustka et al. | 375/14 |
| 4,358,853 | 11/1982 | Qureshi | 375/39 |
| 4,365,512 | 12/1982 | Woodruff | 73/517 A |
| 4,481,646 | 11/1984 | Godand | 375/77 |
| 4,665,748 | 5/1987 | Peters | 73/505 |
| 4,803,700 | 2/1989 | Dewey et al. | 375/77 |
| 4,814,680 | 3/1989 | Hulsing | 73/505 |
| 4,896,268 | 1/1990 | MacGugan | 73/510 |
| 4,930,351 | 6/1990 | Macy et al. | 73/510 |
| 4,943,789 | 7/1990 | Surie | 375/12 |
| 5,138,883 | 8/1992 | Paquet et al. | 73/504 |
| 5,251,233 | 10/1993 | Labedz et al. | 375/12 |

Primary Examiner—Emanuel T. Voeltz
Assistant Examiner—Hal D. Wachsman
Attorney, Agent, or Firm—H. Frederick Hamann; George A. Montanye; Tom Streeter

[57] ABSTRACT

A sensor such as a quartz angular rate sensor is operated in a closed-loop mode including feedback of a control signal. The sensor produces a modulated carrier frequency signal. For stable operation of the feedback loop, the control signal is obtained from the modulated carrier frequency signal by complex demodulation of the modulated signal to produce an in-phase demodulated signal and a quadrature-phase demodulated signal, and the in-phase demodulated signal and the quadrature-phase demodulated signal are filtered by a complex equalizing filter to produce an equalized in-phase signal and an equalized quadrature-phase signal. The equalized in-phase signal represents information sensed by the sensor, and phase of a demodulation reference signal is adjusted to minimize appearance of the information in the equalized quadrature-phase signal. The equalized in-phase and quadrature-phase signals are complex modulated at the carrier frequency to produce the control signal. To compensate for variable delay or phase shift through the feedback loop, the phase of the control signal is adjusted by a phase adjustment signal. For equalization of an angular rate signal from a quartz angular rate sensor, the complex filtering includes compensation for peaking at the drive fork resonant frequency, compensation for secondary modes of vibration of the drive fork, and phase lead compensation for a relatively flat frequency response over the bandwidth of the angular rate signal.

26 Claims, 24 Drawing Sheets

CLOSED-LOOP BASEBAND CONTROLLER FOR A REBALANCE LOOP OF A QUARTZ ANGULAR RATE SENSOR

RELATED APPLICATIONS

Complex Digital Demodulator Employing Chebychev-Approximation Derived Synthetic Sinusoid Generation, U.S. application Ser. No. 08/105,326 filed Aug. 12, 1993, now U.S. Pat. No. 5,361,036 by Stanley A. White, incorporated herein by reference.

Tracking Filter and Quadrature-Phase Reference Generator, U.S. application Ser. No. 08/116,859 filed Sep. 7, 1993, by Stanley A. White.

Frequency and Phase-Locked Two-Phase Digital Synthesizer, U.S. application Ser. No. 08/117,461 filed Sep. 7, 1993, by Stanley A. White.

BACKGROUND OF THE INVENTION

1. Field of the Invention

The present invention relates generally to digital signal processing, and more particularly to signal processing for a quartz angular-rate sensor or solid-state gyroscope. The present invention specifically relates to a closed-loop baseband controller for generating a nulling feedback signal to the quartz angular-rate sensor.

2. Background Art

Angular-rate sensors are essential components of navigational and inertial guidance systems of aircraft, spacecraft, ships, and missiles. Traditionally, mechanical gyroscopes were used for angular rate sensing. More recently, laser ring gyros and vibrating quartz gyros have been developed that have characteristics superior to mechanical gyroscopes.

A particularly economical vibrating quartz gyro is made by acid etching of a quartz wafer and has two pairs of parallel tines in an "H" configuration. Such a quartz gyro is described, for example, in Fersht et al. U.S. Pat. No. 5,056,366 and Staudte U.S. Pat. No. Re 32,931. One pair of tines (the drive tines) is driven by an oscillator so that the tines move toward each other and away from each other. Rotational motion of the tines about the central longitudinal axis of the "H" causes the vibration of the drive tines to couple, by coriolis force, to the other pair of tines (the pick-off tines). The coriolis force causes the pick-up tines to vibrate in such a way that when one pick-off tine moves in one traverse direction perpendicular to the plane of the "H", the other pick-off tine moves in the opposite transverse direction perpendicular to the plane of the "H". The force, which drives the pick-off tines, is proportional to the cross-product of the angular rate of rotation $\Omega$ (e.g., radians per second), and the linear velocity of the drive tines (e.g., meters per second). Metal film pads are plated onto the tines for piezoelectric coupling to these vibrations of the tines. In the electrical pick-off signal, the angular rate of rotation of the quartz gyro about the longitudinal axis appears as double-sideband suppressed-carrier (DSSC) modulation of input angular rate; the carrier frequency is the frequency of oscillation of the drive tines. Therefore, an angular-rate signal can be recovered from the pick-off signal by a synchronous demodulator.

Analog circuits have been used for exciting the quartz gyro and for synchronous demodulation of the pick-off signal. Analog circuits, however, are subject to voltage offsets and drift of component values due to temperature variations and aging. These problems are particularly troublesome due to peculiarities of the quartz gyro that are not apparent from the simplified or "first order" operating characteristics as described above. One problem is related to the resonant frequencies of the drive tines and the pick-off tines. It is undesirable for the pick-off tines to have the same resonant frequency as the drive tines because of the extreme difficulty of removing the dynamics of the pick-off tines from the pick-off signal. If the pick-off tines did have the same resonant frequency as the drive tines, then a maximum amplitude response would be obtained from the pick-off tines, but the angular-rate signal would be a very non-linear function of the angular rate. The resonant frequency of the pick-off tines, however, must be tuned relatively closely to the resonant frequency of the drive tines, or else the dynamic range of the angular-rate signal is limited by noise. Therefore, some resonant frequency offset is required between the drive tines and the pick-off tines. This compromise in resonant frequency offset is to an extent dependent on the bandwidth of the angular-rate signal. In particular, the pick-off tines have a two-pole resonance characteristic, giving a second-order response ($\approx 1/(\omega^2-\omega_o^2)$) far away from the resonant frequency ($\omega_o$). In practice, these considerations dictate that the difference between the resonant frequency of the drive tines and the resonant frequency of the pick-off tines should be about twice the bandwidth of the angular rate to be sensed by the quartz gyro. A typical quartz gyro for inertial navigation applications, for example, has a drive resonant frequency of about 10 kilohertz, a Q of about 18,000, and a difference of about 100 Hz between the drive resonant frequency and the pick-off resonant frequency. The pick-up tines, for example, have the higher resonant frequency. This difference in resonant frequencies causes the amplitude of the angular-rate signal to be dependent on the frequency as well as the amplitude of vibration of the drive tines. Moreover, the temperature dependence of the difference between the drive and pick-off resonant frequencies is the most critical temperature dependent parameter of the quartz gyro.

To obtain sufficient performance for inertial navigation, the analog circuits associated with the quartz gyro have been relatively complex and expensive. Moreover, it is estimated that the limitations of the prior-art analog circuitry causes the performance of the quartz gyro to be about an order of magnitude less than that theoretically possible and attainable by sufficiently complex digital signal processing.

SUMMARY OF THE INVENTION

To reduce pickup-fork-induced read-out distortion in the angular-rate signal, the detected angular-rate signal is modulated by the fork drive frequency to produce a nulling signal, and the nulling signal is fed back to an additional pair of electrodes on the drive fork. It is desirable to provide suitably "stiff" servo action over the bandwidth of the angular-rate signal, so that the pick-up tines remain at a nearly null position. Attainment of such "stiff" servo action is limited, however, by undesired peaking or instability in the closed-loop response which may occur as the open loop gain is increased.

The present invention recognizes that considerable improvement in the closed-loop response of a quartz angular rate sensor employing feedback of the angular-rate signal can be obtained by complex baseband equalization. The improvement results because the sensor produces an information signal modulated by a carrier signal, and the sensor has a frequency response that is asymmetric with respect to the frequency of the carrier signal and that tracks variations in the frequency of the carrier signal.

The quartz angular rate sensor has a highly asymmetric frequency response that is peaked at the pick-off fork resonant frequency, which is offset from the drive fork resonant frequency. The drive fork is driven at approximately the drive fork resonant frequency. Although the drive fork resonant frequency varies somewhat with temperature, the quartz sensor is fabricated in order to obtain a substantially constant difference between the drive fork resonant frequency and the pick-up fork resonant frequency. Complex baseband equalization therefore provides high gain at the fork drive frequency (by providing a pole at a baseband frequency of zero Hertz), and a zero to cancel the dynamics of the pole at the pick-up fork resonant frequency.

The pick-up fork typically has a number of secondary resonant modes which cause peaks in the open loop frequency response. The complex baseband equalization should remove these peaks by notch filters to ensure stability of the closed-loop frequency response.

The signals which propagate around the feedback loop are subject to delays in the analog-to-digital and digital-to-analog converters, and delays inherent in the digital signal processing for the complex baseband equalization. Therefore, the feedback loop has suitable phase-shift compensation for stability and suitable dynamics and bandwidth.

BRIEF DESCRIPTION OF THE DRAWINGS

Other objects and advantages of the present invention will become apparent upon reading the following detailed description and upon reference to the drawings, in which.

While the invention will be described in connection with certain preferred embodiments, it is not intended that the invention should be limited to these particular embodiments. On the contrary, the invention is intended to include all modifications, alternatives, and equivalent arrangements as may be included within the scope of the appended claims.

DETAILED DESCRIPTION OF THE PREFERRED EMBODIMENTS

Figure 1:
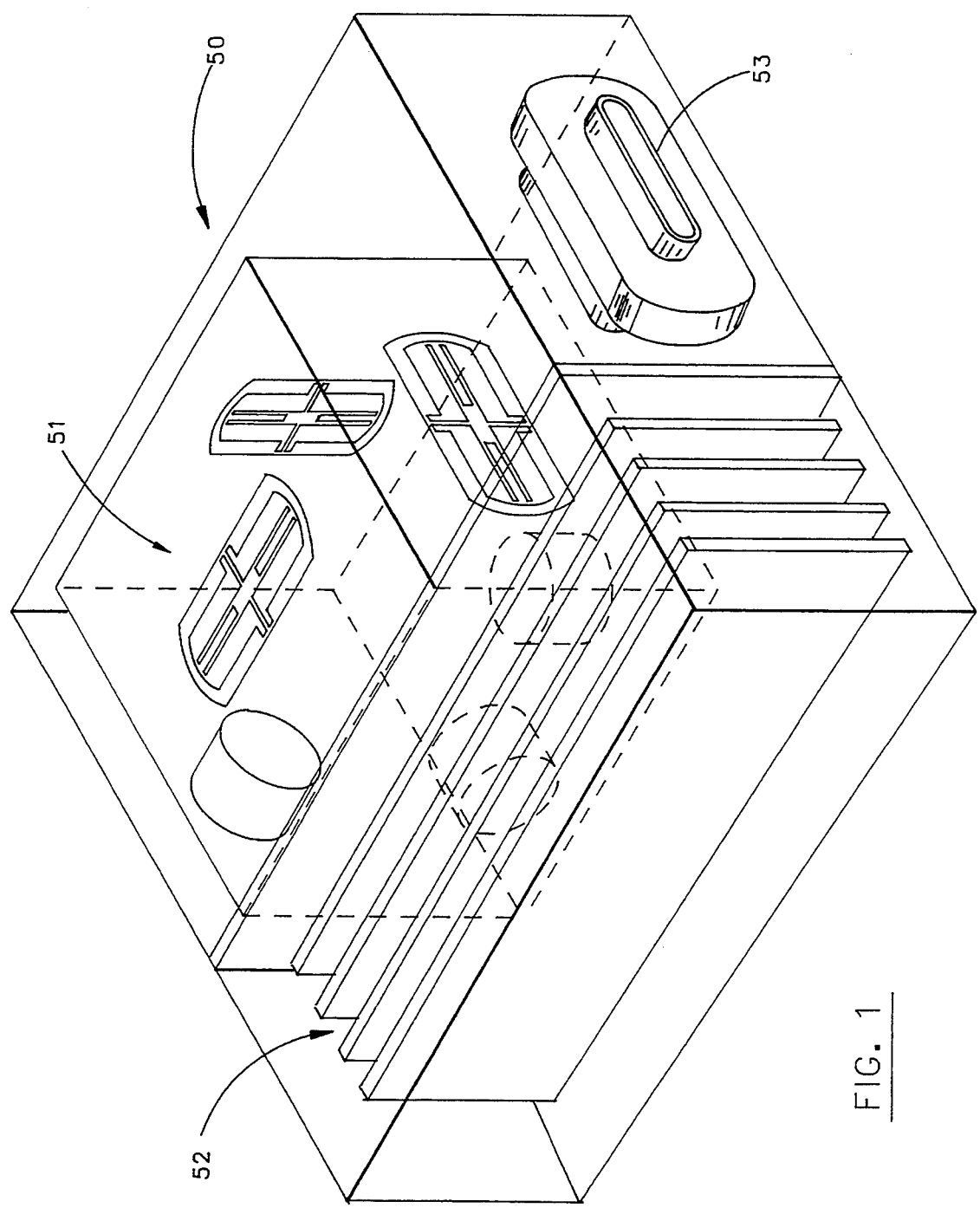
FIG. 1 is a perspective view of an inertial measurement unit incorporating the present invention.

Turning now to the drawings, there is shown in FIG. 1 a schematic perspective view of an inertial measurement unit generally designated 50 incorporating the present invention. The inertial measurement unit includes a block of sensors 51, electronic circuit boards 52, and an electrical connector 53. The inertial measurement unit 50 provides an angular velocity signal and a linear acceleration signal with respect to each of three orthogonal directions. The angular velocity and linear acceleration signals have a 50 Hz bandwidth.

Figure 2:
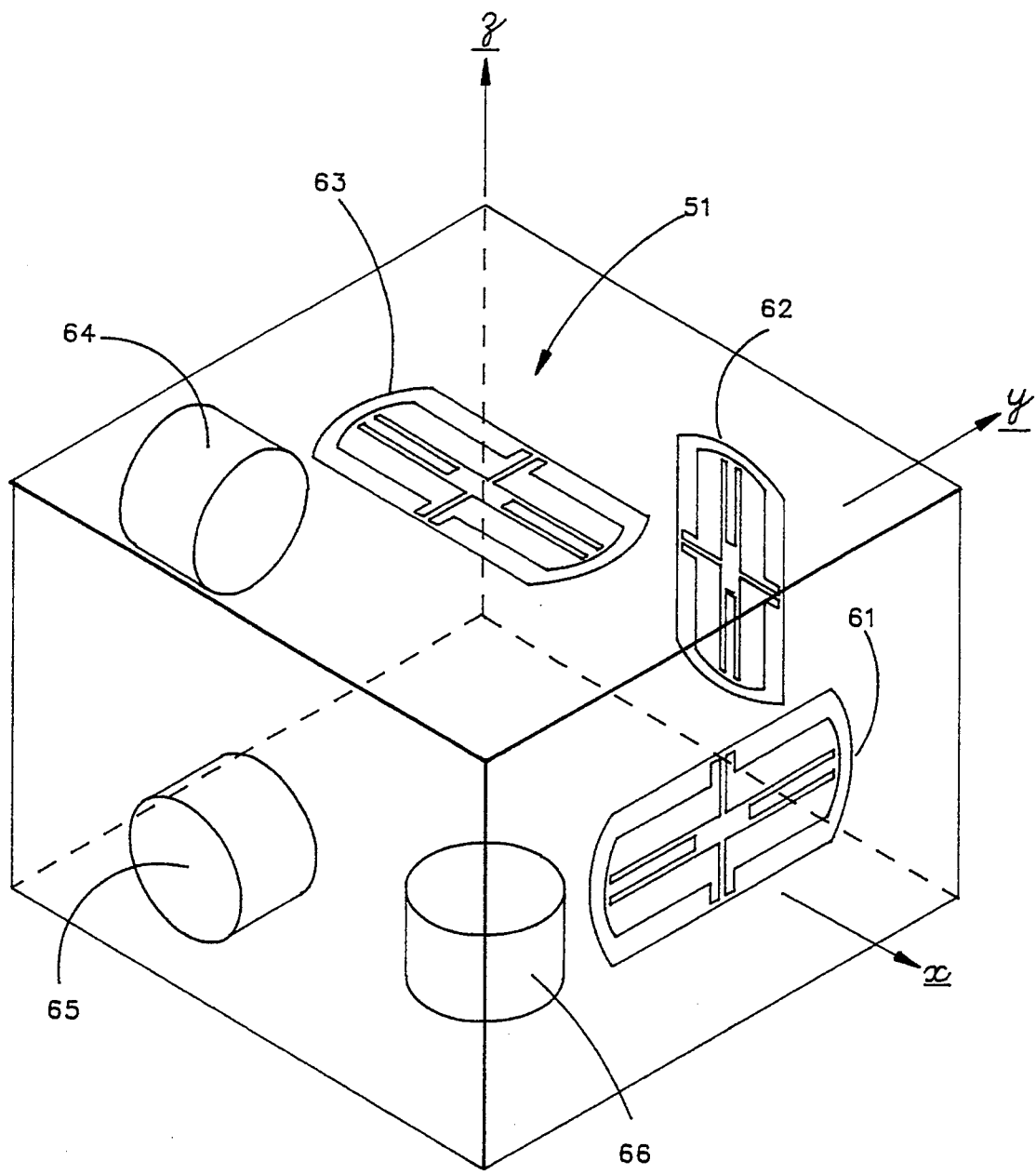
FIG. 2 a pictorial view of a mounting arrangement for accelerometers and quartz angular-rate sensors used in the inertial measurement unit of FIG. 1.

Turning now to FIG. 2, there is shown a pictorial view of the sensor block 51. The block is made of a rigid material such as aluminum or polycarbonate. A quartz angular-rate sensor or a vibrating quartz accelerometer is mounted into each of the six faces of the block 51. The sensors include quartz angular-rate sensors 61, 62, and 63 mounted on the faces facing the +x, +y, and +z directions. The sensors include vibrating quartz accelerometers 64, 65, and 66 mounted on the faces facing the −x, −y, and −z directions, respectively.

The present invention concerns signal processing for the quartz angular-rate sensors 61, 62, and 63. The quartz angular-rate sensors operate entirely independent of the vibrating quartz accelerometers. Therefore, the vibrating quartz accelerometers 64, 65, 66 are not pertinent to the present invention and will not be described in any further detail.

Figure 3:
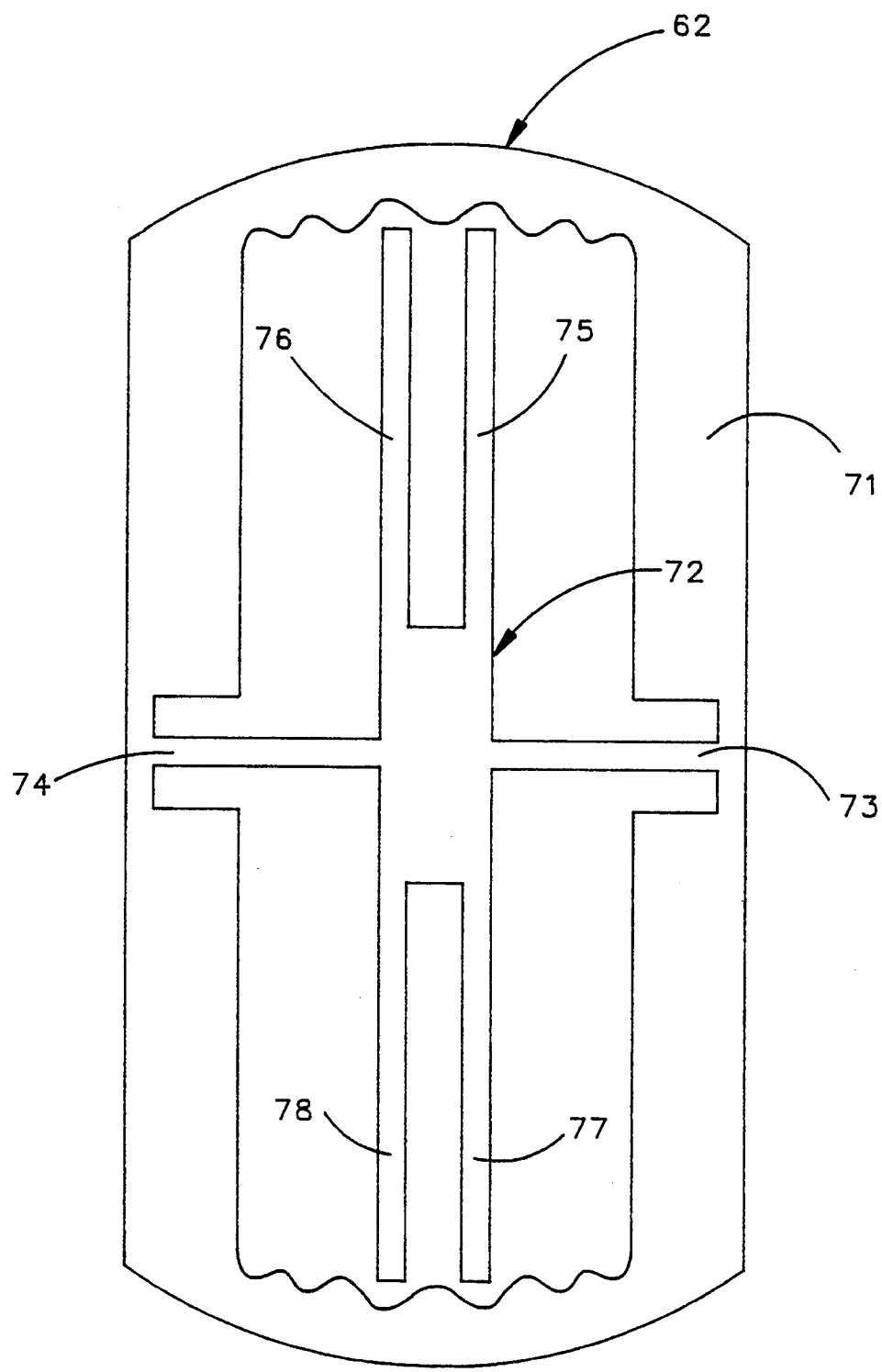
FIG. 3 is a plan view of one of the quartz angular-rate sensors of FIG. 2.

Turning now to FIG. 3, there is shown a more detailed view of the quartz angular-rate sensor 62. The sensor 62 is fabricated from a z-cut quartz wafer using conventional photolithographic and acid etch batch processes, and can be purchased from Systron Donner Corporation of Concord, Calif. The sensor has a frame 71 attached to an "H"-shaped section by a pair of bridges 73, 74. The "H"-shaped section 72 has a pair of drive tines 75, 76, and a pair of pick-up tines 77, 78.

Figure 4:
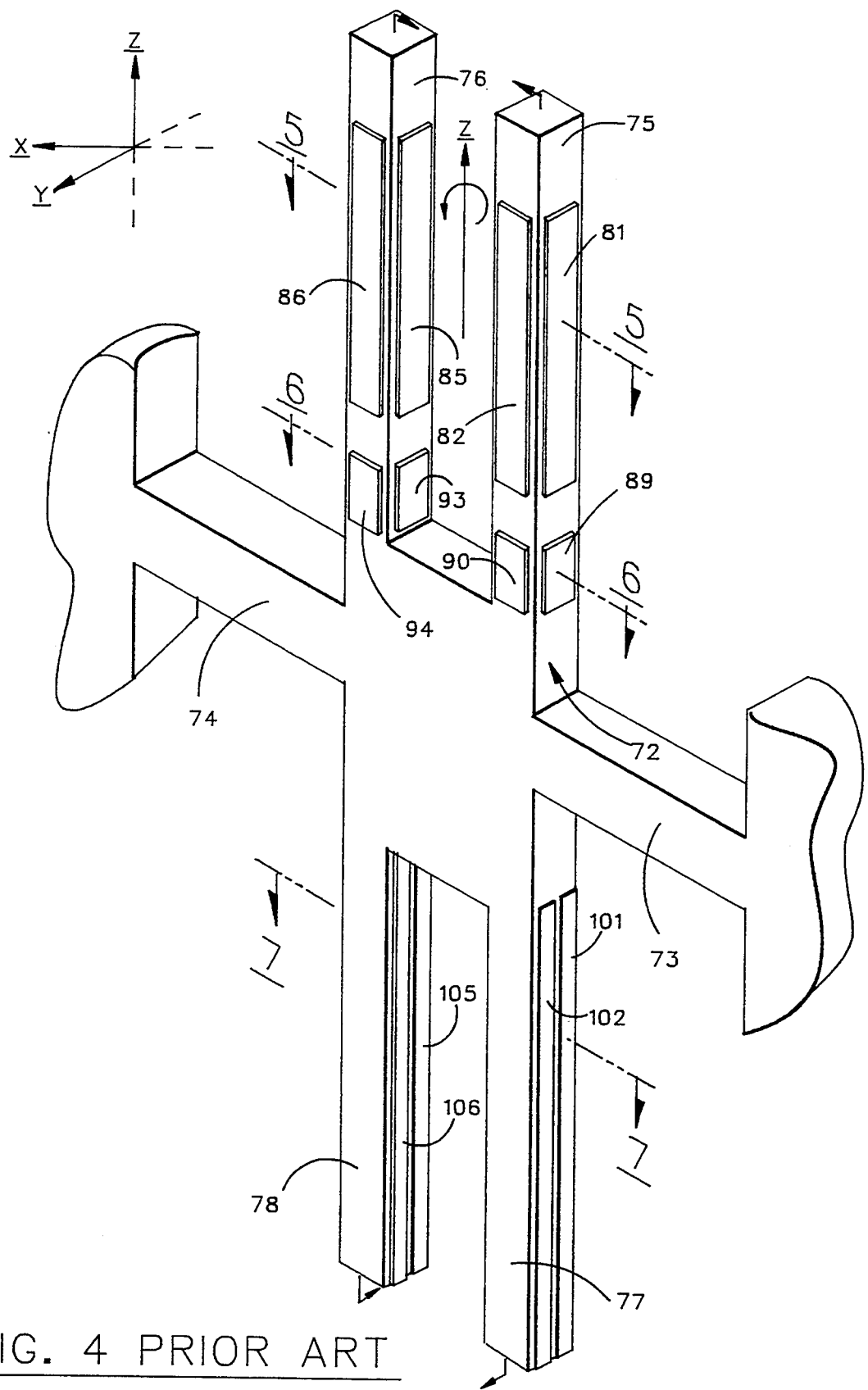
FIG. 4 is a perspective view of a central portion of the quartz angular-rate sensor of FIG. 3.
Figure 5:
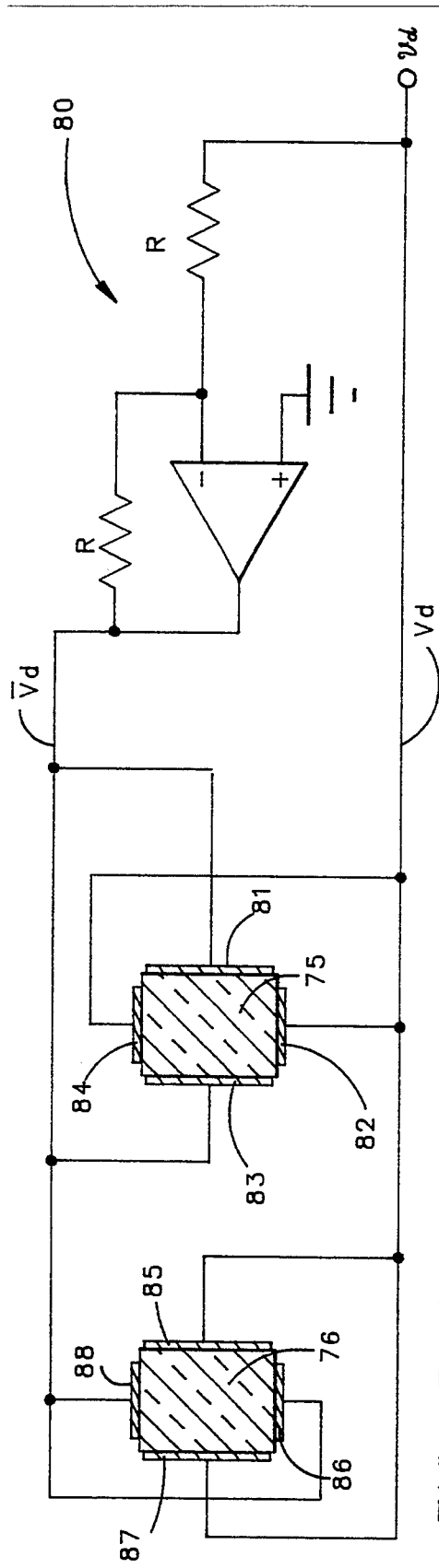
FIG. 5 is a cross-section of drive tines of the quartz angular-rate sensor of FIG. 4 along section line 5—5 in FIG. 4.

Turning now to FIG. 4, there is shown a number of metal film electrodes deposited on the tines 75, 76, 77, and 78. The drive tines 75, 76 are provided with drive electrodes 81, 82, 83, 84, 85, 86, 87, 88, as further shown in FIG. 5. The drive electrodes are driven by a complementary drive signal $V_d$, as shown in FIG. 5, to excite a mode of vibration in the drive tines 75, 76 in which the drive tines first move toward each other in the x direction, as shown in FIG. 4, and then away from each other, during each cycle of vibration. To sustain such a mode of vibration, the complementary drive signal $V_d$ must be tuned to the resonant frequency of the drive tines. As shown in FIG. 5, a unity-gain inverting amplifier 80 is used in providing the complementary drive signal from a single-ended drive signal.

Figure 6:
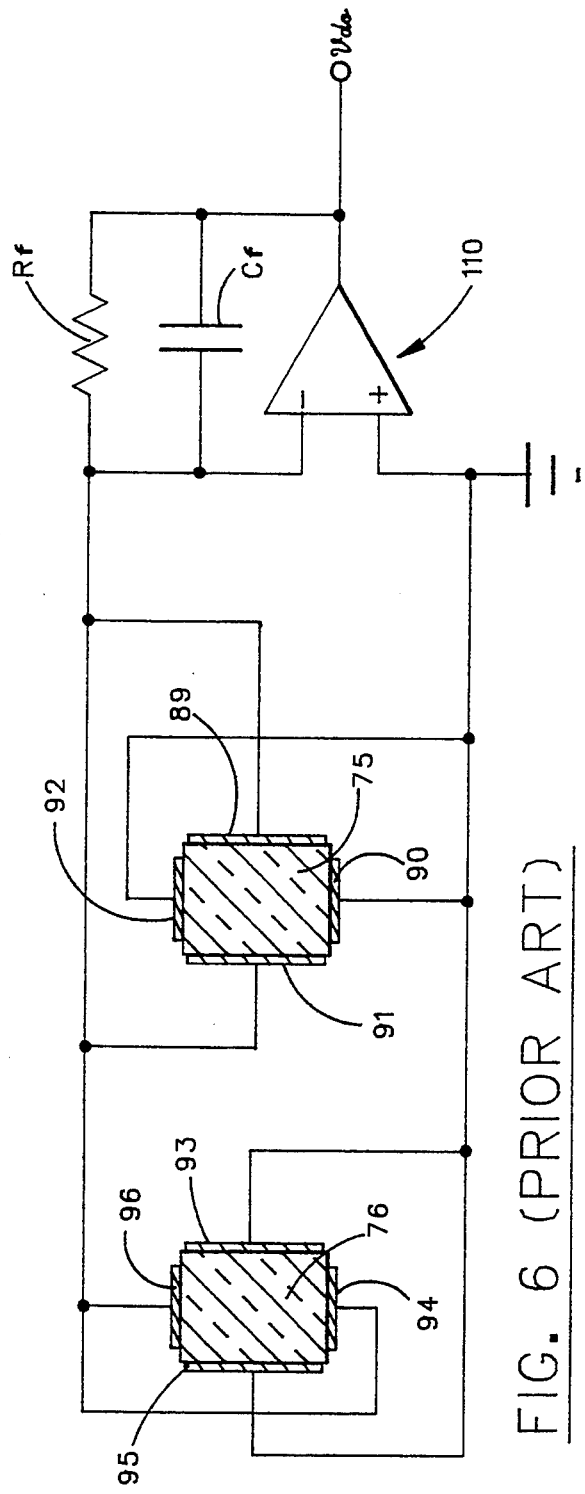
FIG. 6 is a cross-section of the drive tines of the quartz angular-rate sensor of FIG. 4 along section line 6—6 if FIG. 4.

To drive the drive tines 75, 76 at their resonant frequency, the drive tines are excited in response to sensing their elastic deformation. For this purpose, a second set of metal film electrodes 89 to 96, as further shown in FIG. 6, are disposed on the drive tines 75, 76 at locations of maximum elastic deformation where the tines are joined to the central portion of the H-shaped structure 72, as shown in FIG. 4. These electrodes 89 to 96 are connected to a conventional amplifier 110 providing a signal $v_{do}$ indicating the elastic deformation of the drive tines 75, 76.

As shown in FIG. 4, the vibration of the pick-up tines 77, 78 is sensed by metal film electrodes 101 to 108 deposited on the pick-up tines. As further shown in FIG. 7, the pick-up electrodes 101 to 108 are connected to a conventional amplifier 111 to provide a signal $v_r$ indicating the vibration of the pick-up tines.

Figure 7:
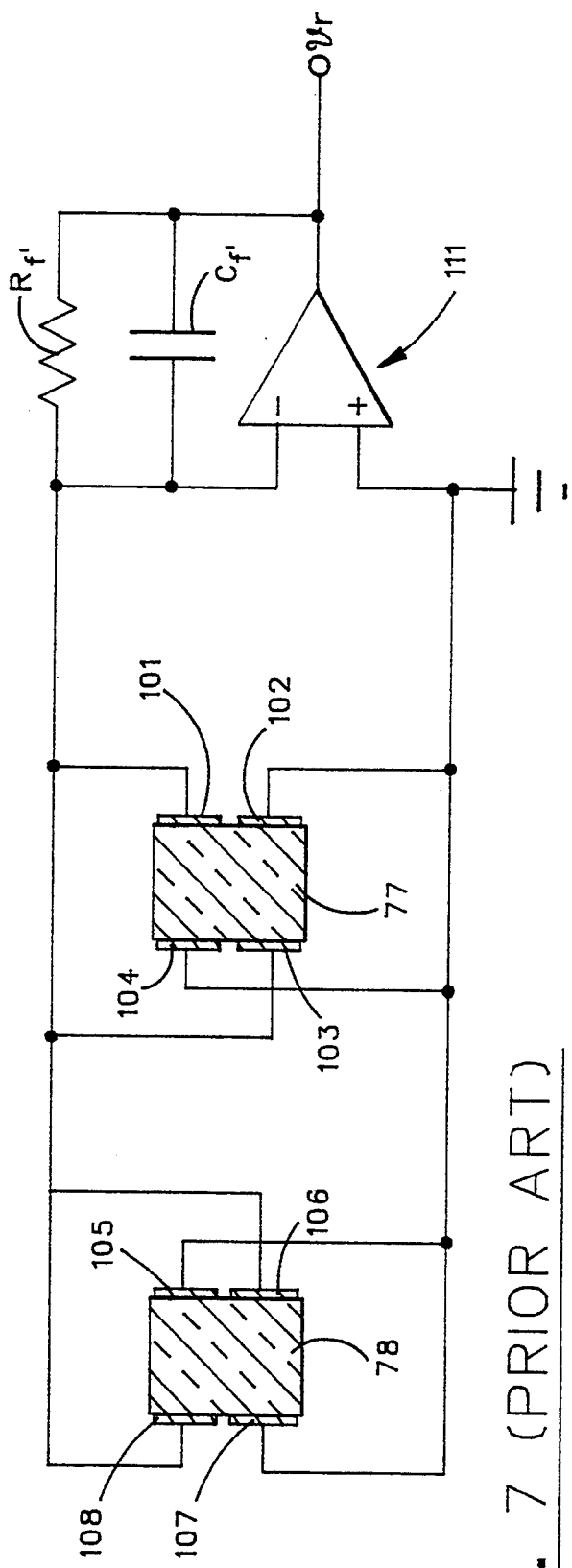
FIG. 7 is a cross-section of pick-up tines of the quartz angular-rate sensor of FIG. 4 along section line 7—7 in FIG. 4.
Figure 8:
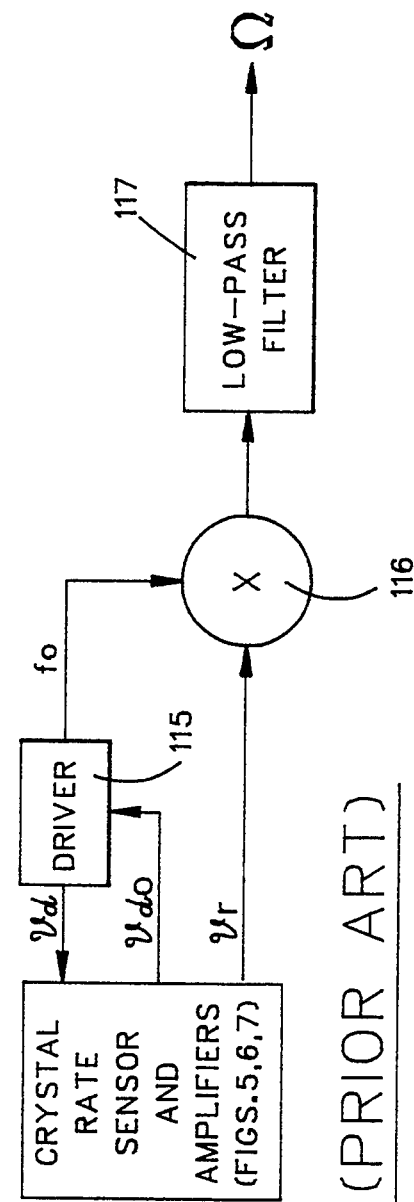
FIG. 8 is a block diagram of a conventional system for exciting the quartz rate sensor of FIG. 4 and synchronously detecting an angular-rate signal.

Turning now to FIG. 8, there is shown a conventional circuit for obtaining an angular-rate signal $\Omega$ from the quartz rate sensor and amplifiers as shown in FIGS. 5, 6, and 7. A driver circuit 115 is responsive to the signal $v_{do}$ to produce a drive signal $v_d$ at the resonant frequency of oscillation of the drive tines (75, 76 in FIG. 4). Moreover, the driver circuit 115 insures that the amplitude of vibration of the drive tines 75, 76 is substantially constant. Further, the driver 115 supplies a signal at the frequency of oscillation $f_o$ to a synchronous detector 116, such as a balanced modulator, that modulates the pick-up signal v; to detect the angular-rate information. A low-pass filter 117 extracts the angular-rate signal $\Omega$ from the output of the synchronous detector 116.

Figure 9:
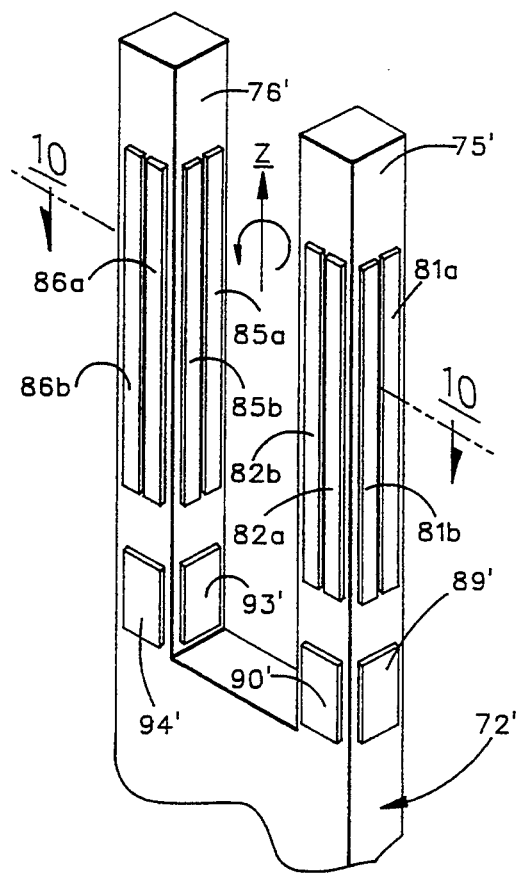
FIG. 9 is a perspective view showing an alternative construction for electrodes on drive tines of a quartz angular-rate sensor.
Figure 10:
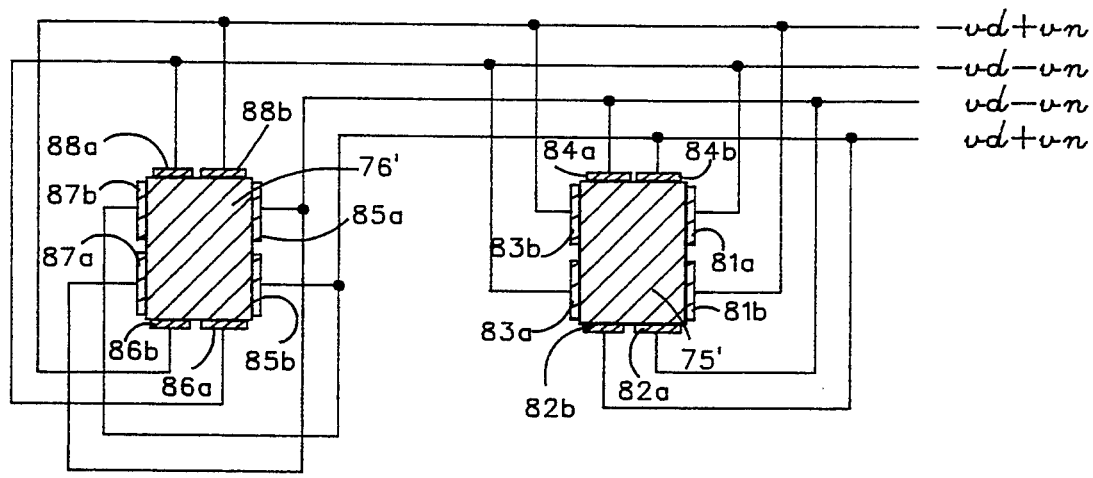
FIG. 10 is a cross-section of the drive tines of the quartz angular-rate sensor of FIG. 9 along section line 10—10 of FIG. 9.

Turning now to FIG. 9, there is shown an alternative construction in which pairs of drive electrodes 81a, 81b, to 88a, 88b, are deposited on the drive tines 75', 76', as further shown in FIG. 10. In this alternative construction, the drive electrodes 81a, 81b, to 88a, 88b are excited with a nulling signal $v_n$ in addition to the drive signal $v_d$. The nulling signal $v_n$ excites vibrations of the drive tines 75', 76' that directly couple to the pick-up tines (not shown), and therefore the nulling signal can be adjusted to minimize or null the vibration of the pick-up tines 77, 78.

Figure 11:
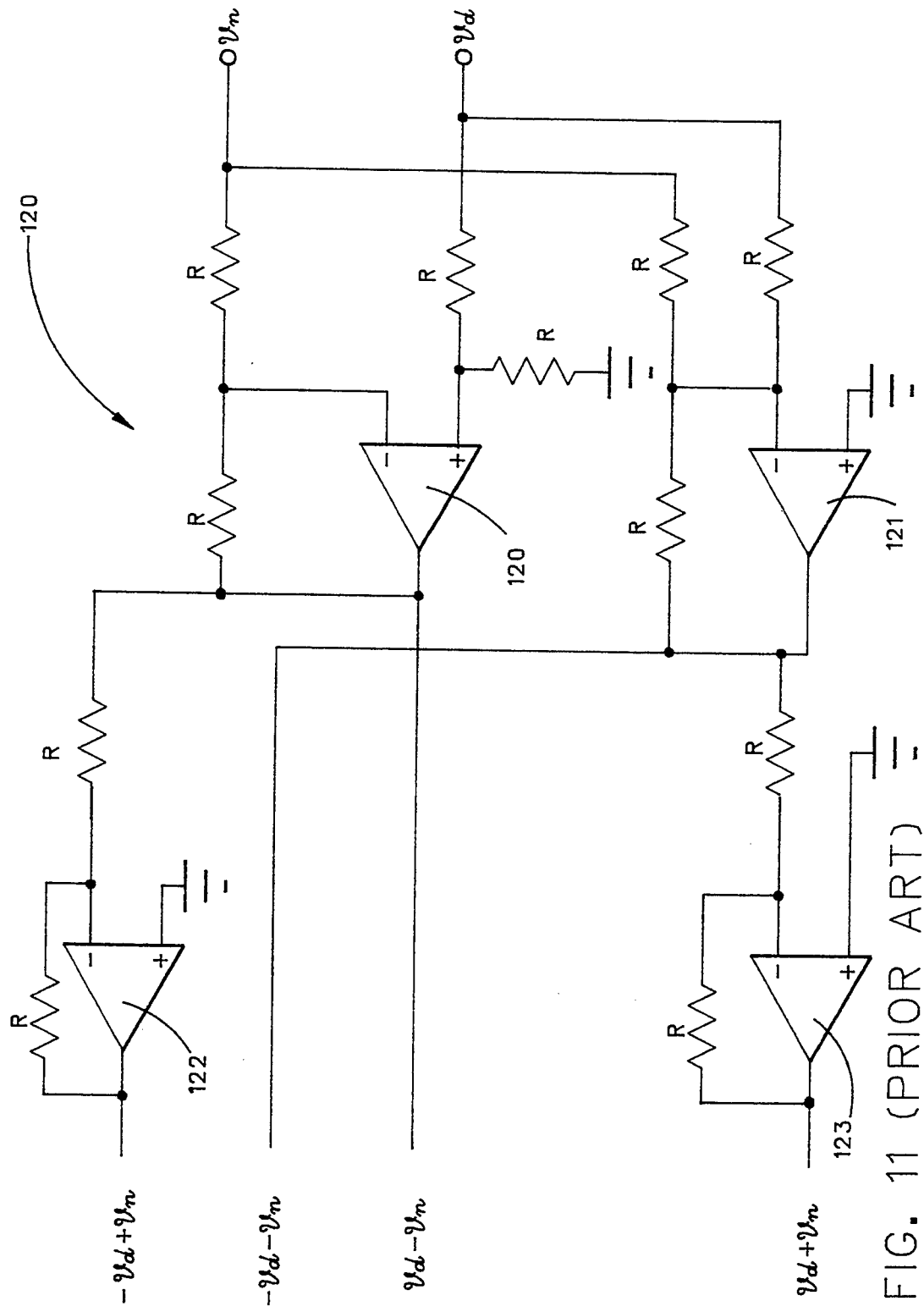
FIG. 11 is a schematic diagram of analog computational circuits for computing drive signals for the drive electrodes as shown in FIG. 10.

As shown in FIG. 11, analog computational circuits 120 receive a single-ended drive signal $v_d$ and a single-ended null signal $v_n$ to produce electrical signals $(-v_d+v_n, -v_d-v_n, v_d-v_n, -v_d-v_n)$ that are applied to the pairs of drive electrodes (81a, 81b, to 88a, 88b in FIG. 10). These analog computational circuits 120 include an operational amplifier 120 wired as a differential amplifier, an operational amplifier 121 wired as an inverting summing amplifier, an operational amplifier 122 wired as an inverting unity gain amplifier, and an operational amplifier 123 wired as an inverting unity gain amplifier.

Figure 12:
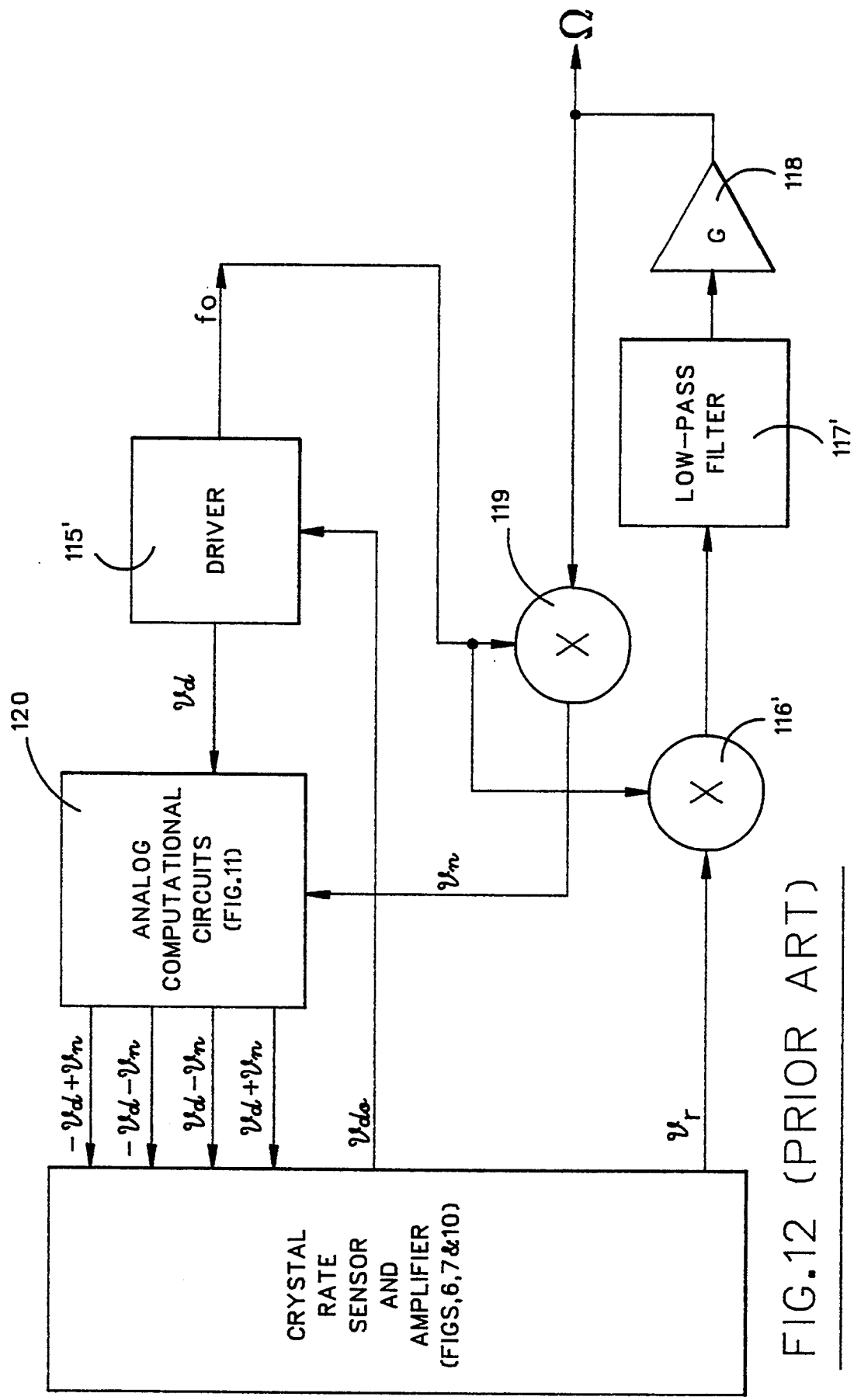
FIG. 12 is a conventional circuit for exciting the quartz rate sensor of FIG. 9 and synchronously detecting an angular-rate signal.

When the quartz rate sensor is operated such that a null signal $v_n$ nulls out the pick-up signal $v_r$, the crystal rate sensor is said to be operated in a "closed loop" mode. A circuit for operating the quartz rate sensor in such a "closed-loop" mode is shown in FIG. 12. The circuit includes a driver 115', a synchronous detector 116', and a low-pass filter 117' that are similar to the driver 115, synchronous detector 116, and low-pass filter 117 introduced in FIG. 8. However, the circuit in FIG. 12 further includes a baseband servo equalizer and feedback amplifier 118, a balanced modulator 119 for supplying the null signal $v_n$ at the frequency of oscillation $f_o$ but having an amplitude controlled by negative feedback to null out the pick-up signal $v_r$, and the analog computational circuits 120 shown in FIG. 11. Therefore, the amplifier 118 provides the angular-rate signal $\Omega$.

Figure 13:
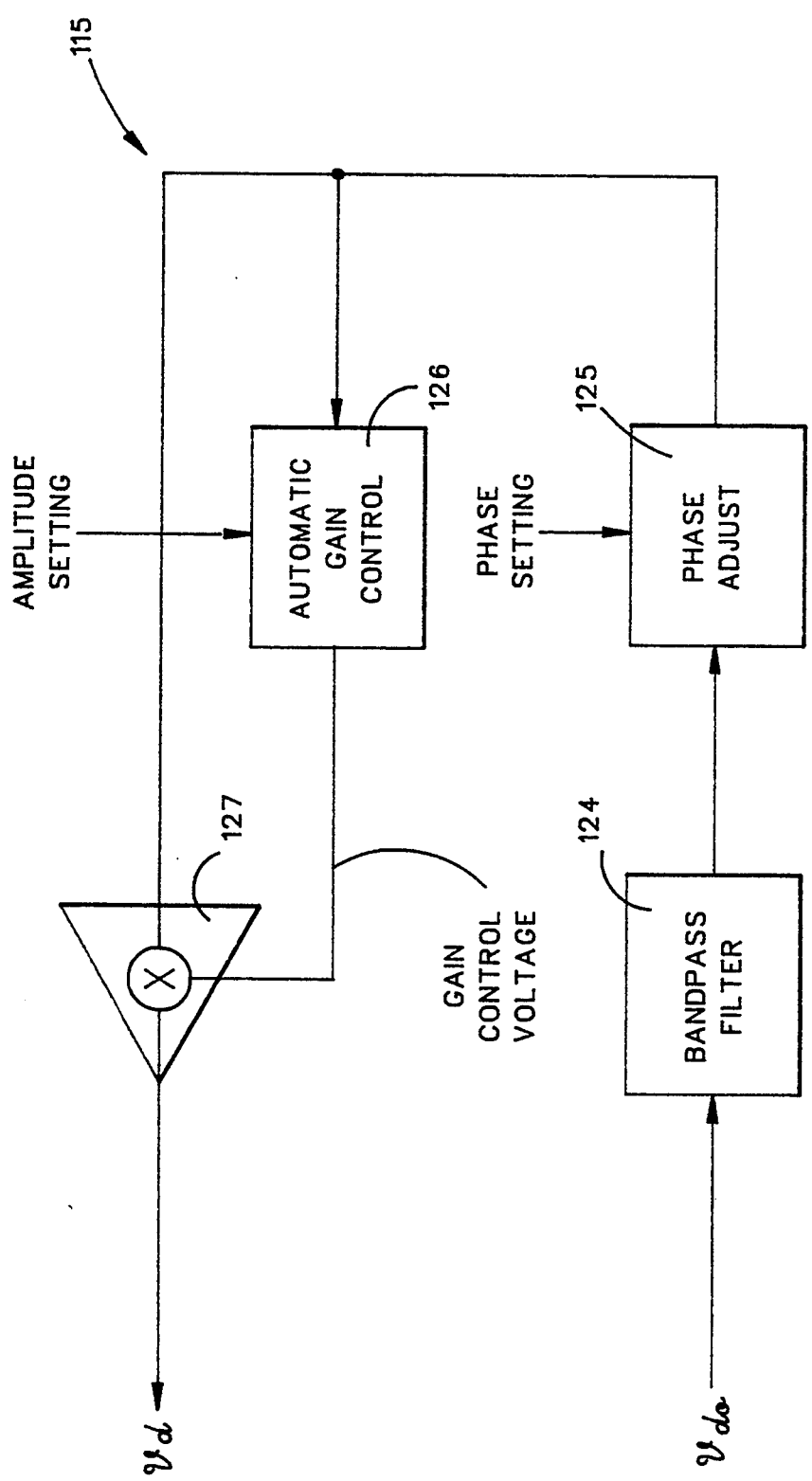
FIG. 13 is a block diagram of an analog drive circuit used in FIG. 12 for exciting the quartz rate sensor.

Turning now to FIG. 13, there is shown a block diagram for the driver circuit 115 of FIG. 8. The driver circuit 115 includes a bandpass filter 124 that filters the $v_{do}$ signal and is tuned for a maximum response at the resonant frequency $f_o$ of the drive tines. The output of the bandpass filter 124 is fed through a phase-adjusting circuit 125 that is adjusted for (360)(n) degree (n is any integer) phase shift around the entire drive loop, through the drive electrodes (81 to 88 in FIGS. 4 and 5), through the physics of the drive fork, through the drive sensing electrodes (89 to 96 in FIGS. 4. and 6), and through the electronics in FIG. 13. The output of the phase-adjusting circuit is fed to an automatic gain control 126 that senses the amplitude of the signal from the phase-adjusting circuit and generates a gain control voltage responsive to the difference between the amplitude of the signal from the phase-adjusting circuit 125 and an amplitude setting. The amplitude setting may be adjusted, for example, in response to calibrating the angular-rate sensor by subjecting the sensor to a precise rate of angular rotation and adjusting the amplitude setting so that the angular-rate signal $\Omega$ precisely indicates the rate of angular rotation. The gain-control voltage from the automatic gain control adjusts the gain of a linear amplifier 127 that amplifies the output of the phase-adjusting circuit 125 to produce the drive signal $v_d$. The linear amplifier, for example, is an operational transconductance amplifier, such as RCA part No. CA3080.

Figure 14:
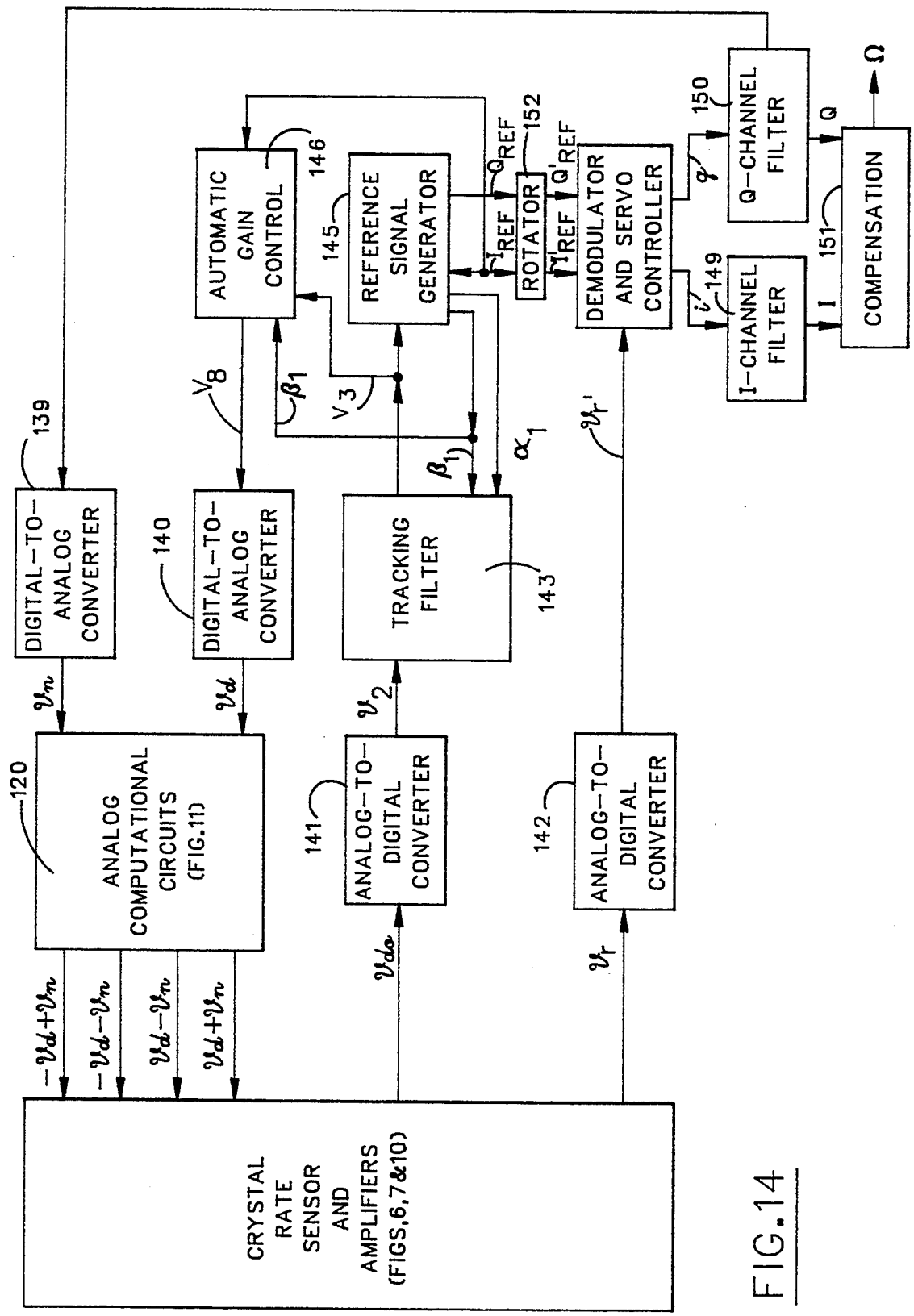
FIG. 14 is a block diagram of an angular rate sensing system incorporating the present invention.

Turning now to FIG. 14, there is shown a block diagram of a quartz rate sensor system using digital signal processing in accordance with the present invention. This system uses a "closed loop" configuration similar to that shown in FIG. 12. The nulling signal $v_n$ to the quartz rate sensor is produced by a digital-to-analog converter 139 in response to a digital value $v_n'$. The drive signal $v_d$ to the quartz rate sensor is produced by a digital-to-analog converter 140 in response to a digital value $v_8$. The nulling signal $v_n$ and the drive signal $v_d$ are combined by the analog computational circuits 120 of FIG. 11 and are interfaced to the drive fork as shown in FIG. 10. The digital-to-analog converters 139 and 140, for example, are 16-bit monolithic voltage output D/A converters such as Analog Devices part no. AD569, or Analog Devices 18-bit digital-to-analog converters part no. AD1139.

As shown in FIG. 14, the output voltage $v_{do}$ indicating the level of excitation of the quartz rate sensor is sampled by an analog-to-digital converter 141 to produce a digital signal $v_2$. In a similar fashion, the pick-off signal $v_r$ is sampled by an analog-to-digital converter 142 to produce a digital signal $v_r'$. The analog-to-digital converter 141 and the analog-to-digital converter 142, for example, are 16-bit 100k SPS sampling analog-to-digital converters, such as the Analog Devices part no. AD676, which uses a switched-capacitor/charge redistribution architecture. The digital-to-analog converters 139 and 140, and the analog-to-digital converters 141 and 142, are all clocked in synchronism with a fixed sampling rate, which is, for example, 42 kHz. For the inertial measurement unit as shown in FIG. 1, the circuit as shown in FIG. 14 is replicated three times, and all of the digital-to-analog converters and analog-to-digital converters are clocked in synchronism with a common system clock (not shown) which is external to the inertial measurement unit 50. The system clock, for example, is part of an avionics package that receives the angular rate and linear acceleration information from the inertial measurement unit 50.

Aside from the quartz rate sensor and amplifiers, the digital-to-analog converters 139 and 140, and the analog-to-digital converters 141, 142 in FIG. 14, all of the other components are synchronous digital logic circuits which could be implemented as either a programmed data processor or as hard-wired logic, for example, in an application-specific integrated circuit. The synchronous digital circuits, for example, could be implemented in a Star Semiconductor SPROC programmable digital signal processing (DSP) integrated circuit which is designed for fixed-point 24-bit arithmetic.

In order to excite the quartz rate sensor at the resonant frequency of the drive tines (75 and 76 in FIG. 4), the digital circuitry in FIG. 14 includes a tracking filter 143 that tracks the resonant frequency of the drive tines, a reference signal generator 145, and an automatic gain control 146.

The signal $v_{do}$ includes a noise-contaminated demodulation reference signal that is slowly drifting in frequency. The tracking filter 143 has an adjustable passband width $(\alpha_1)$ and an adjustable passband center frequency $(\beta_1)$ that are automatically adjusted in order to extract the demodulation reference signal. Therefore, the output $v_3$ of the tracking filter 143 is a very clean sinusoid.

The reference signal generator 145 provides two reference signals $I_{REF}$ and $Q_{REF}$ which are exactly 90° apart in phase. A rotator 152 performs a complex rotation upon the reference signals $I_{REF}$ and $Q_{REF}$ to produce adjusted reference signals $I'_{REF}$ and $Q'_{REF}$, which are used to demodulate the angular rate signal $\Omega$ from the pick-off signal $v_r$. The reference signal generator 145 also provides exactly an integral number n times 360° of phase shift around the drive loop. Therefore the drive tines of the quartz rate sensor are driven at their resonant frequency, which occurs when there is zero phase shift through the drive tines. Furthermore, the reference signal produces a passband width control signal $(\alpha_1)$ and a passband center frequency control signal $(\beta_1)$ for adjusting the tracking filter 143.

The automatic gain control 146 provides exactly unity gain around the drive loop by exciting the drive tines so that the reference frequency signal extracted by the tracking filter 143 has a constant amplitude.

In order to demodulate the angular rate signal $\Omega$ from the pick-off signal $v_r$, a demodulator and servo controller 147 demodulates the signal $v_r'$ from the analog-to-digital converter 142 by the in-phase reference signal $I'_{REF}$ and by the quadrature-phase signal $Q'_{REF}$ to produce a complex demodulated signal that is processed by baseband equalizing filters to produce an in-phase product value (i) and a quadrature-phase product value (q). The demodulator and servo controller 147 also modulates the (i) and (q) product signals by the drive frequency $f_o$ and shifts the modulated signal by a selected phase angle in order to produce the nulling signal $v'_n$.

The in-phase product value (i) is received in an I-channel filter 149, which is a conventional decimating digital low-pass filter, to produce a filtered value I at a lower rate such as 600 Hz. In a similar fashion, the quadrature-phase product value (q) is received in a Q-channel filter 150, which also is a conventional decimating digital low-pass filter, to produce a filtered value Q at a lower rate such as 600 Hz.

Because the circuit of FIG. 14 provides both in-phase and quadrature-phase detected signals, any phase shift or tuning error between the reference signal $I'_{REF}$ and the suppressed carrier in the pick-off signal $v_r$ can be corrected by a rotation of the complex vector $I+iQ$, and this rotation can be performed by the rotator 152. For example, all of the detected angular-rate signal should appear in the in-phase channel I of FIG. 14. In practice, however, there will be some phase offset causing some of the angular-rate signal to appear in the quadrature-phase channel Q.

In general, the angular-rate signal $\Omega$ should have a sign that is the sign of the signal in the in-phase channel I and a corrected magnitude equal to the square root of $I^2 + Q^2$. In fact, imperfections within the instrument, alignment errors, and capacitive coupling cause extraneous contributions to the I and Q signals which should be eliminated by calibration and post-processing by computing $\Omega$ from the signals I and Q after removal of the extraneous contributions. Compensation 151 for the extraneous contributions could be performed by referencing calibration data retrieved from calibration tables programmed in non-volatile memory.

Figure 15:
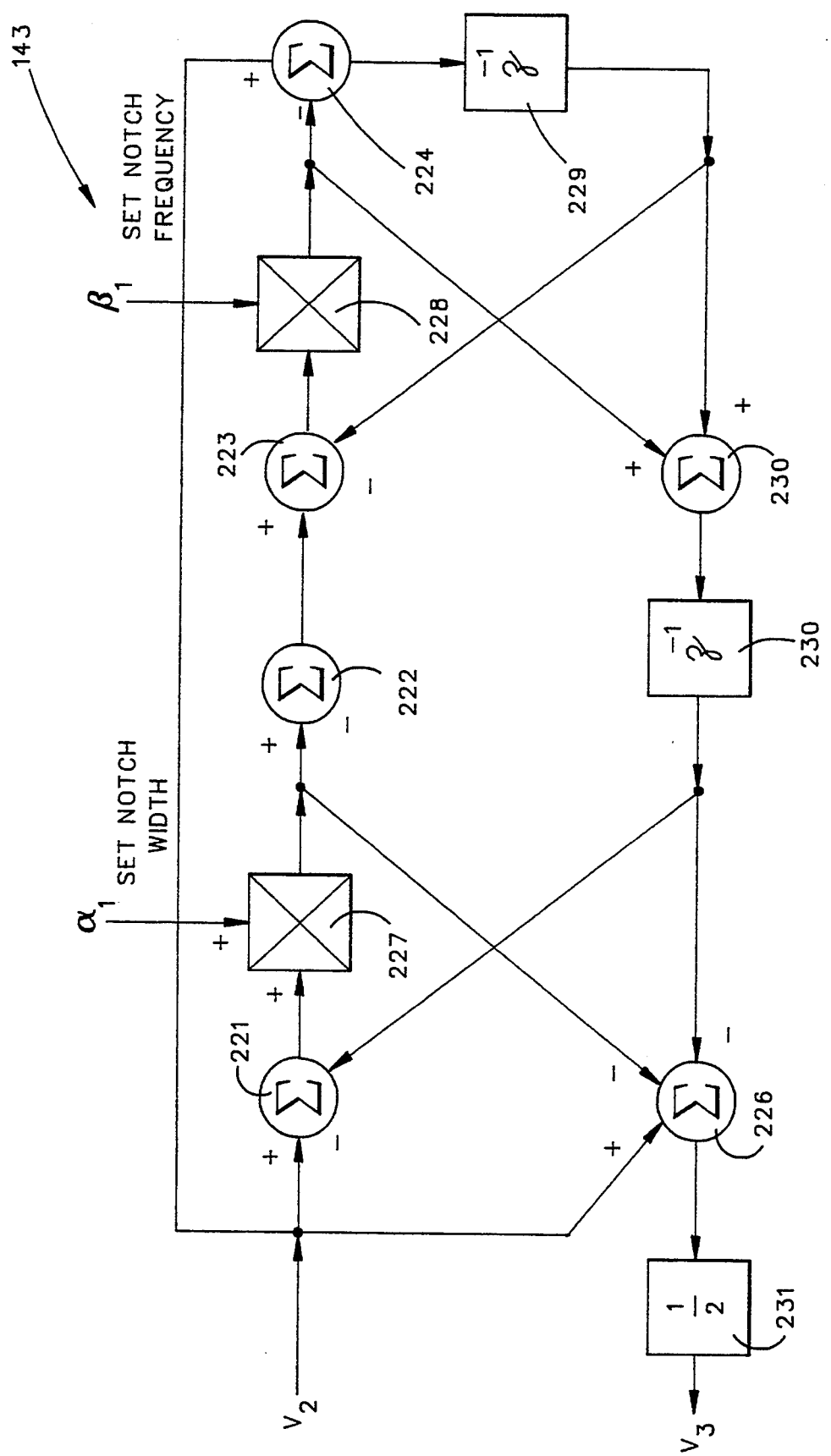
FIG. 15 is a schematic diagram of a tracking filter used in the system of FIG. 14.

Turning now to FIG. 15, the tracking filter 143 is shown in greater detail. The tracking filter includes six summing nodes 221, 222, 223, 224, 225, 226, two multipliers 227, 228, and two delay units 229 and 230 each providing a delay of one sampling period T. The tracking filter also includes a scaling unit 231 having a scale factor of ½, which is conveniently obtained by an arithmetic right shift operation in a programmed digital signal processor. The passband-width of the tracking filter is set by the parameter $\alpha_1$ that is produced by the reference signal generator 145 of FIG. 14. The passband center frequency of the tracking filter is set by the parameter $\beta_1$ that is also produced by the reference signal generator 145 of FIG. 14. Further details regarding the tracking filter 143 are disclosed in the tracking filter design program listed in Appendix III.

Figure 16:
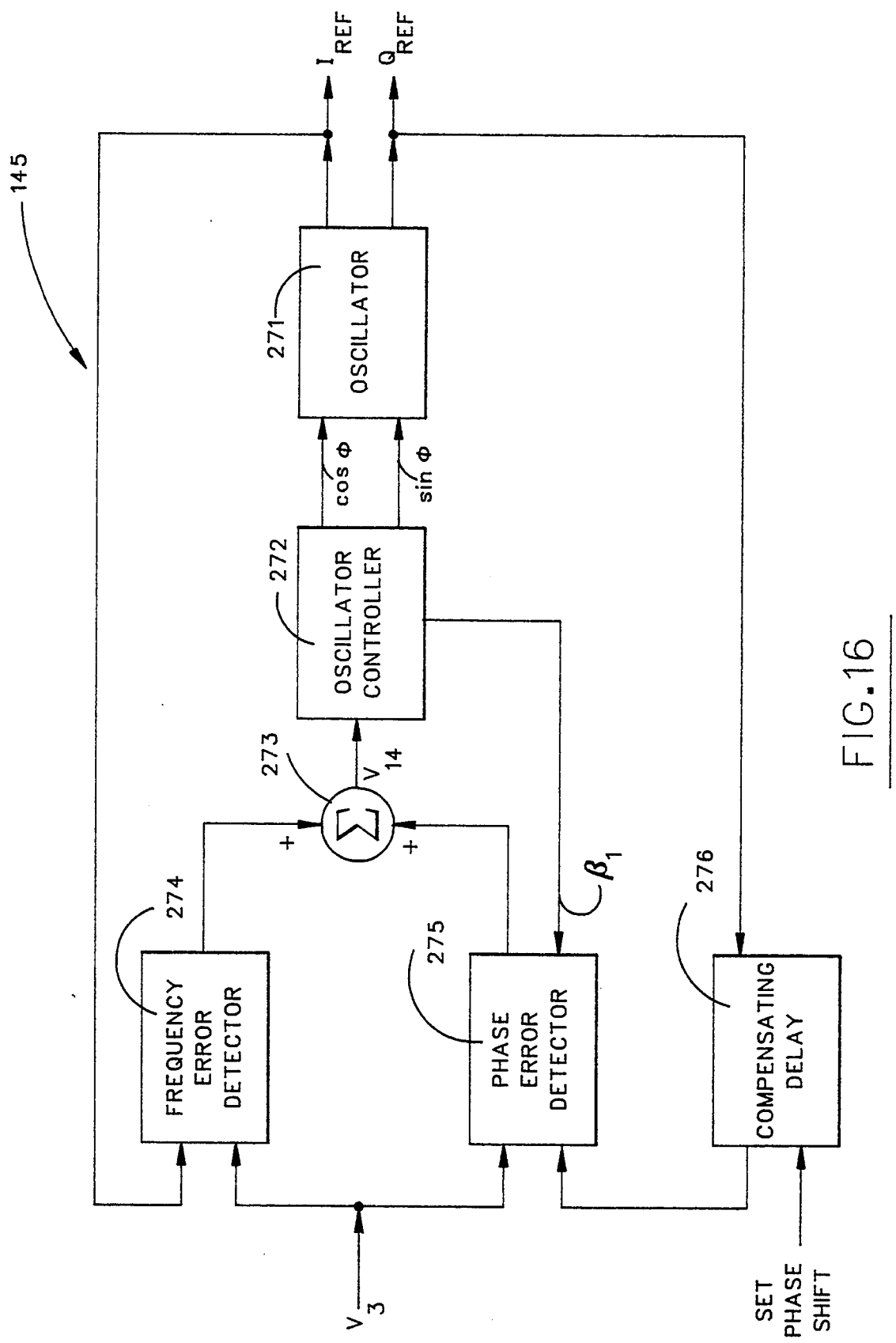
FIG. 16 is a block diagram of a reference signal generator used in the system of FIG. 14.

Turning now to FIG. 16, there is shown a schematic diagram of the reference signal generator 145. The in-phase reference signal $I_{REF}$ and the quadrature-phase reference signal $Q_{REF}$ are generated by an oscillator 271 that is phase-locked to the sinusoidal component of the signal $v_3$ at frequency of oscillation $f_o$ of the drive fork. The oscillator 271 receives a pair of frequency control signals $\cos\phi$ and $\sin\phi$ from an oscillator controller 272. The oscillator controller 272 integrates an error signal $v_{14}$ from an adder 273. The adder adds a frequency error signal from a frequency error detector 274 to a phase error signal from a phase error detector 275. The frequency error detector 274 detects any difference in frequency between the frequency of the signal $v_3$ and the frequency of the oscillator 271. The phase error detector 275 detects the difference in phase between the signal $v_3$ and the quadrature-phase reference signal $Q_{REF}$ after the quadrature-phase reference signal is delayed by a predetermined phase shift in a compensating delay unit 276. This predetermined phase shift is adjusted to set the phase shift across the drive fork to approximately zero. The phase error detector 275 also receives the passband center-frequency control parameter $\beta_1$ from the oscillator controller 272.

Figure 17:
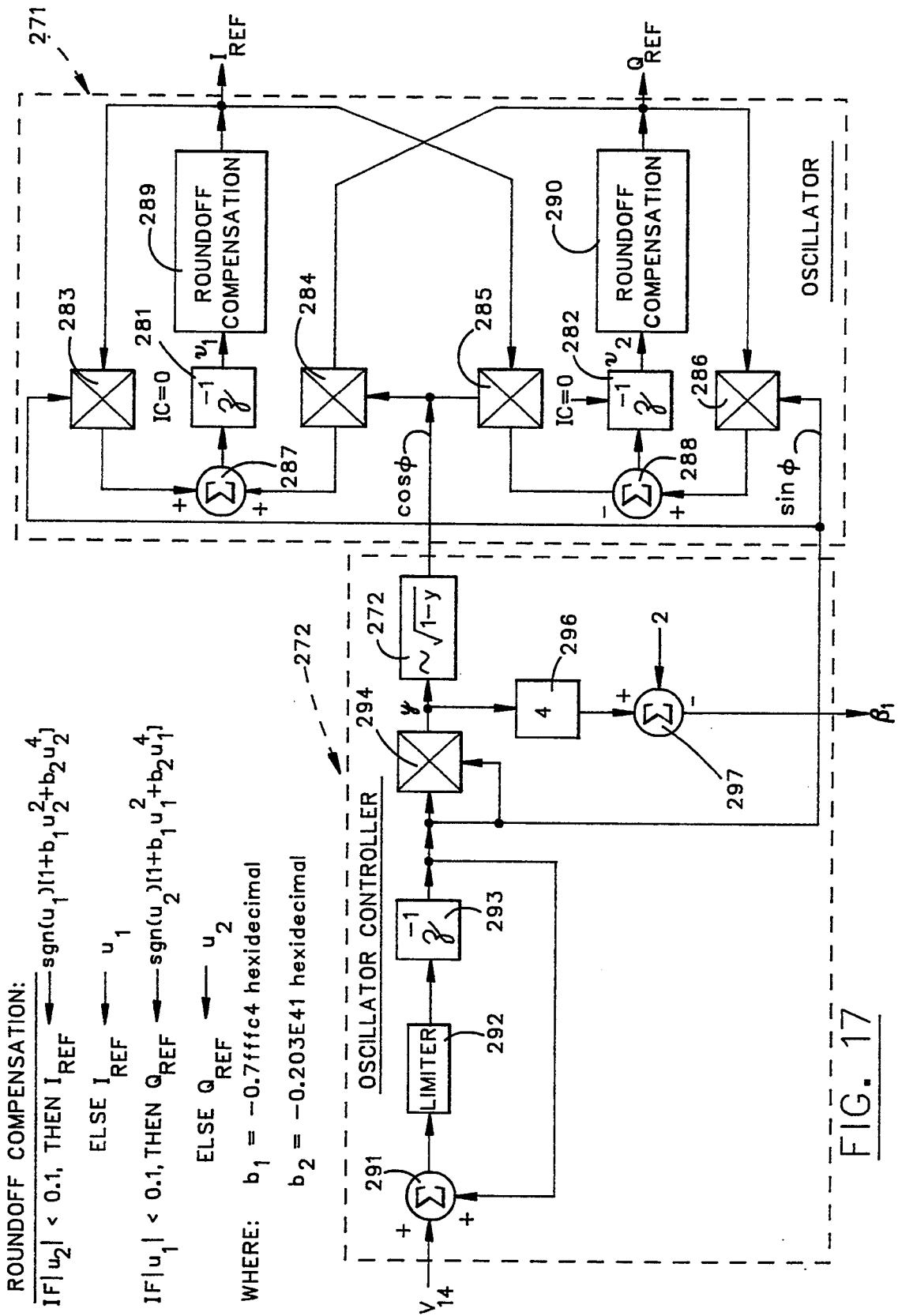
FIG. 17 is a schematic diagram of a digital oscillator and an oscillator controller used in the reference signal generator of FIG. 16.

Turning now to FIG. 17, there is shown a schematic diagram of the oscillator controller 272 and the oscillator 271 introduced in FIG. 16. As shown in FIG. 17, the oscillator includes two delay units 281, 282, four multipliers 283, 284, 285, 286, two summing nodes 287, 288, and two roundoff compensation units 289, 290. The frequency control signal $\cos\phi$ sets the gain of the multipliers 284, 285, and the frequency control signal $\sin\phi$ sets the gain of the multipliers 283, 286. The center frequency of the oscillator is $(\frac{1}{4})f_s$, and it occurs when $\phi=0$. In general, the frequency of the oscillator is $\omega=\theta/T$, where $\theta=\pi/2+\phi$ radians. The delay unit 281 is set to an initial condition (IC) of one, and the delay unit 282 is set to an initial condition of zero. These initial conditions ensure that the $I_{REF}$ signal starts out as a cosine, and the $Q_{REF}$ signal starts out as a sine.

The outputs of the delay units 281 and 282 are indicated as $u_1$ and $u_2$, respectively, which are inputs to the roundoff compensation units 289, 290, respectively. The roundoff units implement the following logic:

IF $|u_2|<0.1$, THEN
    $I_{REF} \leftarrow \text{sgn}(u_1)[1+b_1 u^2_2+b_2 u^4_2]$ ELSE $I_{REF} \leftarrow u_1$ IF $|u_1|<0.1$, THEN
    $Q_{REF} \leftarrow \text{Sgn}(u_2)[1+b_1 u^2_1+b_2 u^4_1]$ ELSE $Q_{REF} \leftarrow u_2$ WHERE: $b_1 = -0.7\text{fffc}4$ hexadecimal $b_2 = -0.203\text{E}41$ hexadecimal The roundoff compensation units prevent the accumulation of roundoff error. When one channel has an output that is close to zero, the output of the other channel is computed to a high degree of precision.

The oscillator controller 272 has an accumulator or integrator including an adder 291, a limiter 292, and a delay unit or register 293. Therefore, the phase error in the signal $v_{14}$ is integrated to obtain the frequency offset $\sin\phi$. The limiter 292 limits the frequency of oscillation of the oscillator 271 to within $\frac{1}{8} f_s$ and $\frac{3}{8} f_s$, where $f_s$ is the sampling frequency. To compute the corresponding control parameter $\cos\phi$, a multiplier 294 computes $\sin^2\phi$, and a computational unit 294 computes the square root of one minus y, where y is $\sin^2\phi$. Preferably, the square root of one minus y is computed by an 8-term Chebychev polynomial approximation:

$$\sqrt{1-y} \approx \sum_{i=0}^{7} a_i y^i$$

where:
    $a_0 = 1$
    $a_1 = -0.800044$ hexadecimal
    $a_2 = -0.1\text{FF}585$ hexadecimal
    $a_3 = -0.109\text{BC}8$ hexadecimal
    $a_4 = -0.05\text{AOC}5$ hexadecimal
    $a_5 = -0.178\text{DE}2$ hexadecimal
    $a_6 = 0.1\text{B}649\text{B}$ hexadecimal
    $a_7 = -0.2093\text{C}3$ hexadecimal To generate the passband center-frequency parameter $\beta_1$, the oscillator controller 272 has a scaling unit 296 that scales the value of y by a factor of four (an arithmetic left shift by two binary places), and a subtractor 297 that generates the parameter $\beta_1$ by subtracting two from the output of the scaling unit.

Figure 18:
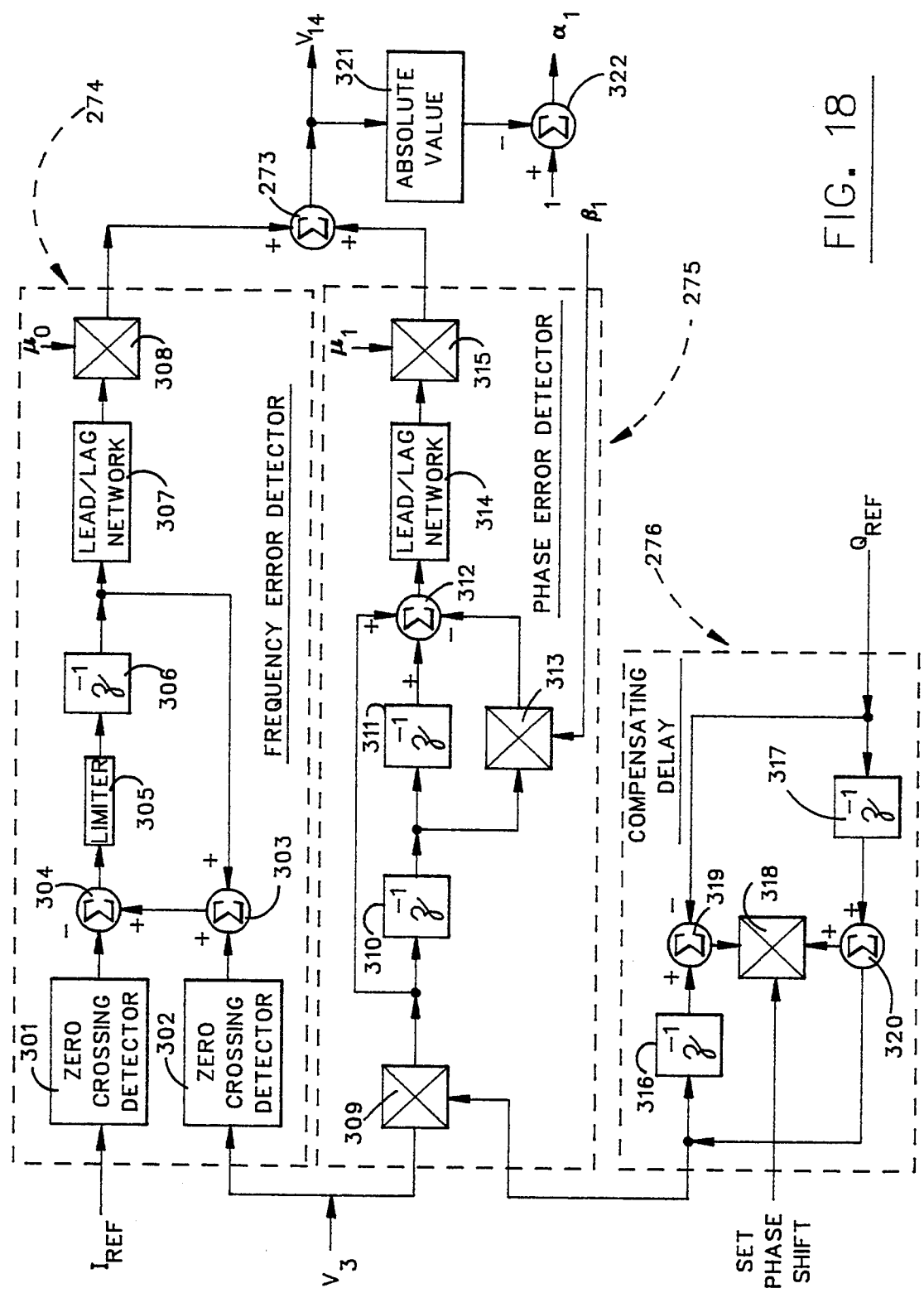
FIG. 18 is a schematic diagram showing a frequency-error detector, a phase-error detector, and a compensating delay used in the reference signal generator of FIG. 16.

Turning now to FIG. 18, there are shown further details of the frequency error detector 274, the phase error detector 275, and the compensating delay 276. The frequency error detector 274 has at its front end two zero-crossing detectors, 301 and 302. The frequency error detector 274 operates by counting zero crossings and comparing the number of times the signal $I_{REF}$ from the oscillator (271 in FIG. 17) passes through zero. The output of each zero crossing detector 301, 302 is one when a zero crossing occurs and zero the rest of the time. The outputs of the zero crossing detectors 301, 302 are combined through a pair of summing nodes 303 and 304, which together take the difference of the counts from the two zero crossing detectors. The difference of the two counts represents a frequency error; that frequency error is summed in an accumulator, which uses the summing nodes 303, 304 and further includes a limiter 305 and a delay unit or register 306. The accumulated frequency error is then fed to a lead-/lag network 307, which provides stability for the frequency error control loop. A gain scaling unit 308 is also used to help establish the stability by setting the loop gain of the frequency error control loop. The output of the gain scaling unit 308 is therefore the frequency error that drives the oscillator controller (272 in FIG. 17). If there is no frequency error, the output of the scaling unit 308 will be zero, and the adder 273 and the subsequent oscillator controller (272 in FIG. 17)

will be driven only by the phase error signal from the phase error detector 275.

To generate the phase error, a multiplier 309 multiplies the input signal $v_3$ by a delayed reference signal from the delay unit 276. The AC component of the product is cancelled by a notch filter, which consists of delays 310, 311, an adder 312, and a multiplier 313. The multiplier 313 receives the passband center-frequency parameter $\beta_1$ from the oscillator controller (272 in FIG. 17), so that the notch filter is tuned to reject the AC component at twice the frequency of oscillation. The output of the notch filter is the raw phase error, which passes through its own separate lead/lag network 314 to stabilize the phase error correction loop, and a multiplier 315 to set the gain of the phase error correction loop.

The compensating delay 276 is an all-pass filter that provides an adjustable phase delay, in order to adjust the phase shift across the drive fork. The compensating delay 276 includes two delay units 316, 317, a multiplier 318, a subtractor 319, and an adder 320. The coefficient of the multiplier 318 sets the phase shift of the compensating delay 276.

To generate the passband-width parameter $\alpha_1$, an absolute value unit 321 produces the absolute value of the signal $v_{14}$, and a subtractor 322 subtracts the absolute value from a constant value of 1.

Figure 19:
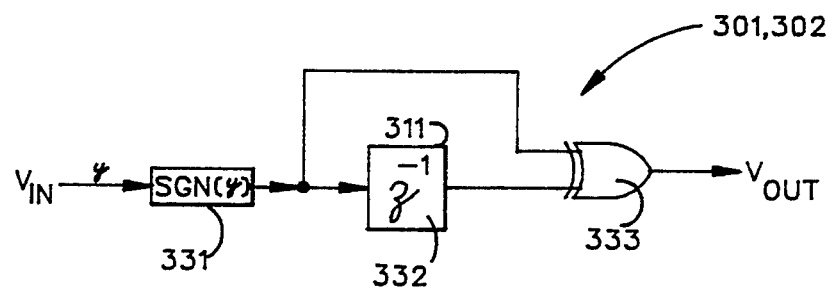
FIG. 19 is a schematic diagram of a zero crossing detector used in the frequency-error detector of FIG. 18.

Turning now to FIG. 19, there is shown a schematic diagram of one of the zero crossing detectors 301, 302 used in the frequency error detector 274 of FIG. 18. As shown in FIG. 19, the zero crossing detector has a sign extractor 331 that extracts the sign of the input signal $V_{IN}$. The extracted sign is delayed in a delay unit 332. An exclusive-OR gate 333 compares the current sign from the sign extractor 331 to the delayed sign in the delay unit, and signals a zero crossing when the signs are different.

Figure 20:
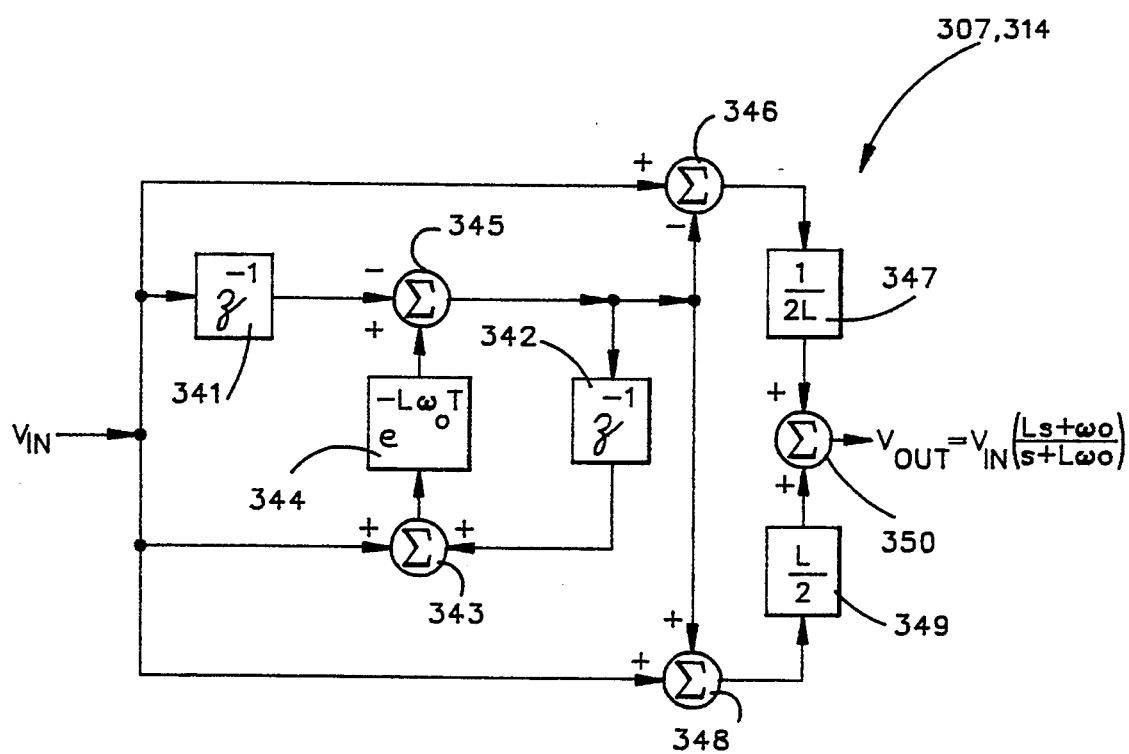
FIG. 20 is a schematic diagram of a lead/lag network used in the frequency-error detector and in the phase-error detector of FIG. 18.

Turning now to FIG. 20, there is shown a schematic diagram of the lead/lag network 307 or 314 introduced in FIG. 18. The lead/lag network includes a first delay unit 341 which delays the input signal $v_{IN}$ by one sampling period T, and a second delay unit 342 having a delay of one sampling period T and having a feedback path in order to provide the pole in the frequency response of the lead/lag network. A summer 343 sums the output of the second delay unit 342 with the input signal $v_{IN}$, and the sum is scaled by a scale factor having a value of $e^{-L\omega_0 T}$ in a scaling unit 344. The parameter L, for example, has a value of 5.9. A subtractor 345 subtracts the output of the first delay unit 341 from the output of the scaler 344 to provide a difference that is received by the second delay unit 342.

In order to produce the output signal $v_{OUT}$ of the lead/lag network, a subtractor 346 subtracts the output from the subtractor 345 from the input $v_{IN}$, and a scaling unit 347 scales the difference by the factor of $\frac{1}{2}$L. An adder 348 adds the output of the subtractor 345 to the input signal $v_{IN}$, and a scaling unit 349 scales the sum by the factor L/2. Finally, an adder 350 adds the output of the scaling unit 347 to the output of the scaling unit 349 to produce the output signal $v_{OUT}$.

Figure 21:
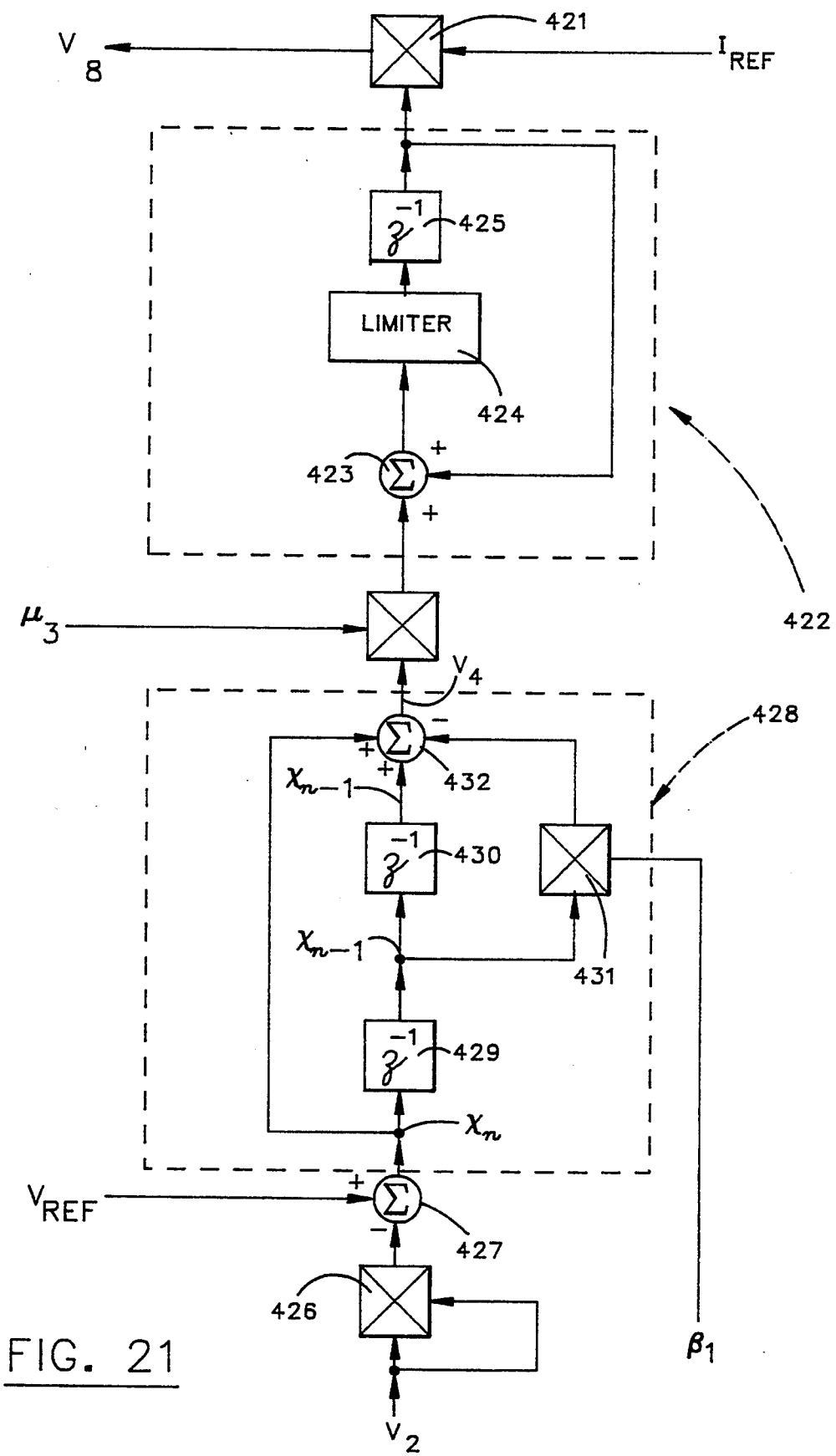
FIG. 21 is a schematic diagram of an automatic gain control used in the system of FIG. 14.

Turning now to FIG. 21, there is shown a schematic diagram of the automatic gain control 146 introduced in FIG. 14. The automatic gain control has a multiplier 421 at the top of the figure that multiplies the signal $I_{REF}$ by a variable gain factor to produce the signal $v_8$. This gain factor is the output of an accumulator generally designated 422, which includes an adder 423, a limiter 424, and a delay unit or accumulator register 425. The accumulator 422 functions as an integrator and lowpass filter. The accumulator 422 is responsive to the error in the comparison of the amplitude of the signal $v_3$ and a reference level set by a reference signal $V_{REF}$. In particular, a multiplier 426 computes the square of the signal $v_3$, and the squared value is subtracted from the reference signal $V_{REF}$ to produce an amplitude error signal. Assuming that the radian frequency of the input signal is $\omega$, the peak amplitude of the signal $v_3$ is A, and the sampling period is T, and the integer n designates the sampling index, then the input signal $v_3(n)$ can be expressed as:

$$v_3(n) = A \sin(\omega nT)$$

by applying a simple trigonometric identity, the square of the signal $v_3(n)$ is:

$$y(n) = v_3^2(n) = A^2 [\sin(\omega nT)]^2 = 0.5 A^2 - 0.5 A^2 \cos(2\omega nT)]$$

Therefore, the squared signal, $y(n)$, consists of two components; a zero-frequency signal information about the amplitude of the signal, $0.5 A^2$; plus a single (unknown)-frequency sinusoid, $-0.5 A^2 \cos(2\omega nT)$.

The reference signal $V_{REF}$ sets the amplitude of the signal $v_3$. If the desired signal amplitude is D, and the value $V_{REF}$ is a constant, then $V_{REF}$ should have a value of $0.5 D^2$. A subtractor 427 subtracts the square from the multiplier 426 from $V_{REF}$, so that the difference signal $x_n$ has a DC value of $0.5 (D^2 - A^2)$, plus the double frequency term containing $2\omega$. The zero-frequency error signal $0.5 (D^2 - A^2)$ is produced even though none of the sample values of the signal $v_3$ may have a value equal to the amplitude A.

In order to remove the double frequency term, the automatic gain control 146 includes a notch filter generally designated 428. This notch filter includes a first delay unit 429 producing a signal $x_{n-1}$, and a second delay unit 430 producing a signal $x_{n-2}$. The notch filter further includes a multiplier 431 for multiplying the signal $x_{n-1}$ by a tuning parameter $\beta_1$, and an adder/subtractor 432 which adds the signal $x_n$ to the signal $x_{n-2}$ and subtracts the product from the multiplier 431 to produce an amplitude error signal $v_4$ from which the double frequency term is substantially removed. The signal $v_4$ is scaled by an adjustable scale factor $\mu_3$ to produce a scaled error signal that is accumulated by the accumulator 422.

Figure 22:
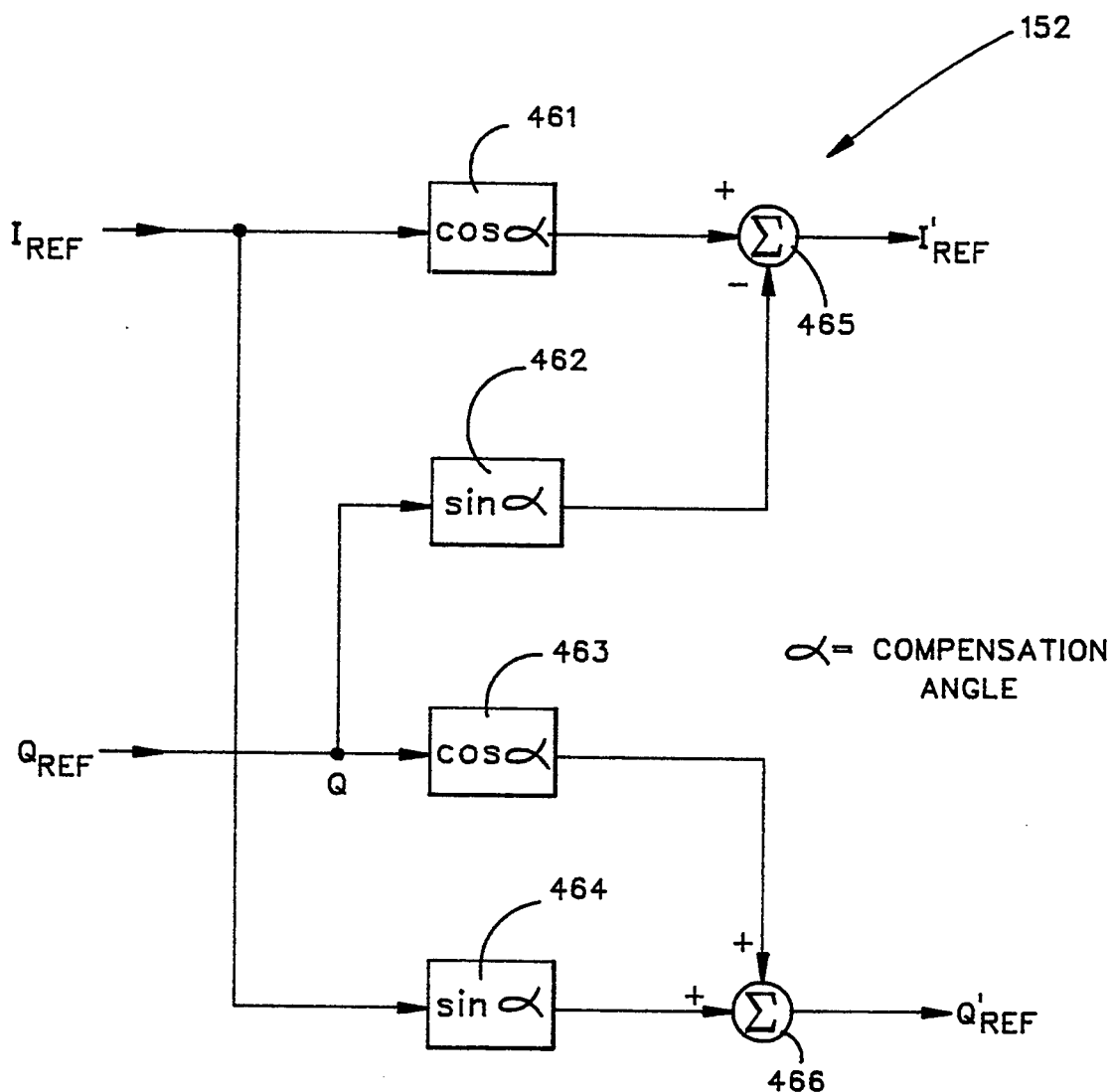
FIG. 22 is a schematic diagram of a rotator used in the system of FIG. 14.

Turning now to FIG. 22, there is shown a schematic diagram of the rotator 152. The complex rotation is provided by four scaling units 461, 462, 463, and 464, a subtractor 465 which produces the transformed in-phase reference signal $I'_{REF}$, and an adder 466 which produces the transformed quadrature-phase reference signal $Q'_{REF}$. The compensation angle $\alpha$ is adjusted during calibration of the system, as described above with reference to FIG. 14, and the sine and cosine of the compensation angle are stored in nonvolatile memory. During the operation of the system, the sign and cosine of the compensation angle $\alpha$ are retrieved from nonvolatile memory to be multiplied by the in-phase reference $I_{REF}$ and the quadrature-phase reference $Q_{REF}$ to perform the scaling functions of the scaling units 461, 462, 463, and 464.

Figure 23:
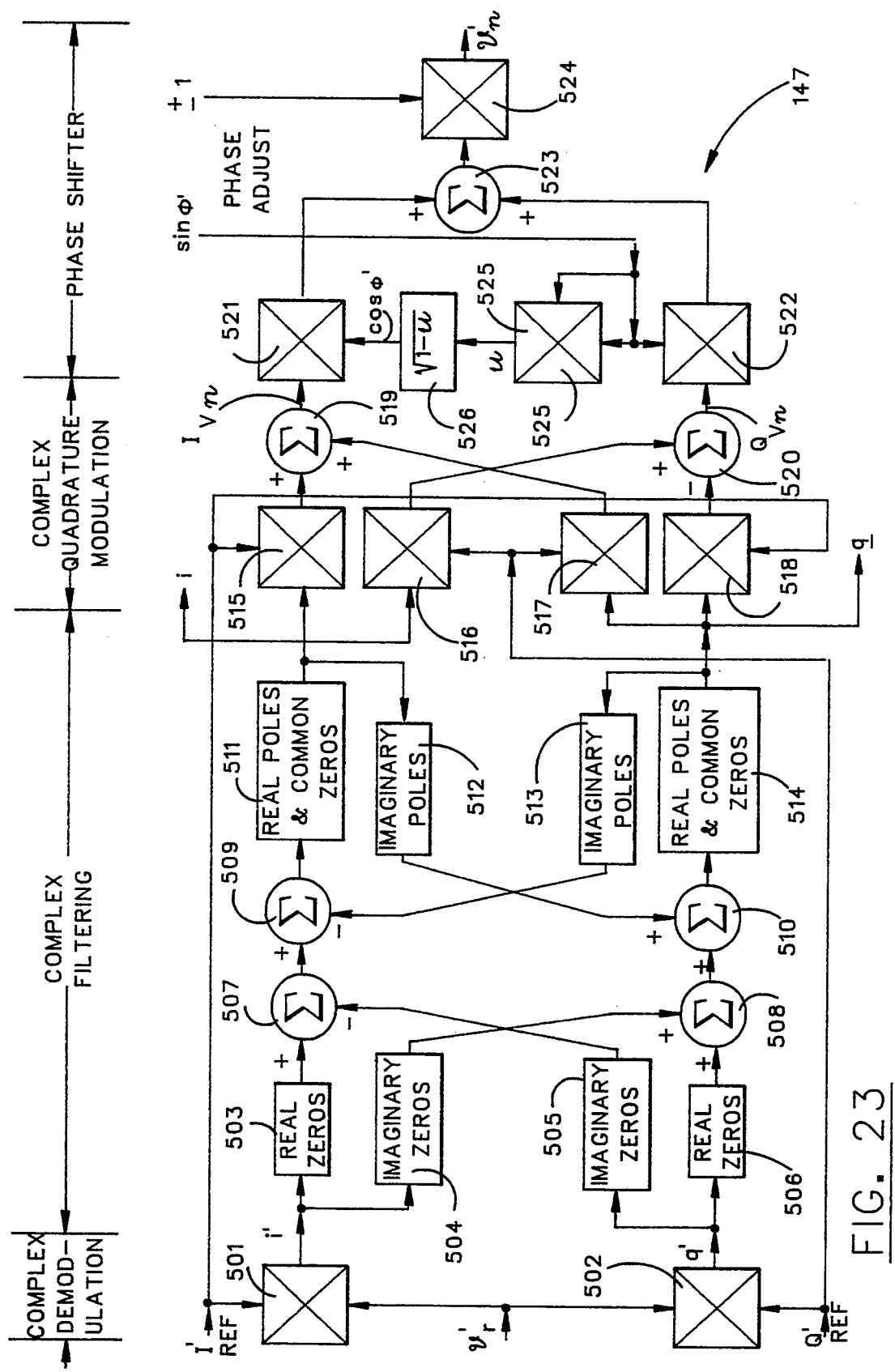
FIG. 23 is a schematic diagram of a demodulator and servo-controller used in the system of FIG. 14.

Turning now to FIG. 23, there is shown a block diagram of the demodulator and servo controller 147 introduced in FIG. 14. The demodulator and servo controller contains a demodulator to take the passband signal $v_r'$ and convert it to baseband. In accordance with an aspect of the present invention, the demodulator and servo controller also performs baseband equalization of the carrier servo system that controls the nulling signal $v_n$. A critical frequency separation, the so-called $\Delta f$, must be maintained to make baseband equalization work properly. $\Delta f$ is the difference between the drive frequency $f_o$ and the pick-off fork resonant frequency. Because the quartz sensor is fabricated so that $\Delta f$ is relatively constant in spite of variations in $f_o$ due to temperature or manufacturing tolerances, the frequency response of the pick-up fork can be equalized at baseband after complex demodulation with the reference signals $I_{REF}'$ and $Q_{REF}'$ which are at the drive frequency $f_o$.

If we had a phenomenon that we were measuring from a sensing instrument, we would normally look at the signal from the sensing instrument and think of that as being a baseband signal insofar as the signal from the sensing instrument reflects physically, in real time, the phenomenon that is being observed. If we modulate that information, that is, multiply it by a sinusoid to center it around some other frequency, the translated information is normally thought of as being a carrier system.

The quartz rate sensor generates a pick-up signal $v_r$ which looks very much like a carrier signal. That signal is centered about the fork drive resonant frequency $f_o$. However, the parameters that should be controlled in the nulling signal feedback loop, the gain and the phase shift, are critically centered around the pick-off resonant frequency, which is nominally 100 Hz away from the drive resonant frequency.

The manufactured parameter that is most closely held in the system is the difference $\Delta f$ between the drive and the pick-off resonant frequencies. Therefore, it is convenient to demodulate the carrier signal down to baseband so that the gain and phase to be controlled are centered about the difference $\Delta f$ between the pick-off resonant frequency and the drive resonant frequency.

At the left-hand end of the demodulator and servo controller 147, multipliers 501 and 502 multiply the digitized pick-off signal $v_r'$ by the in-phase reference signal $I'_{REF}$ and the quadrature-phase reference signal $Q'_{REF}$ to produce respective real and complex components $i'$ and $q'$ of a complex baseband signal $i'+jq'$.

The present invention can effect either complex or real equalization of the complex baseband signal $i'+jq'$ coming out of the complex demodulator consisting of the multipliers 501 and 502. A real equalizer would require one real filter on the real signal path and one real filter on the imaginary signal path. The more general embodiment would use a complex filter. The complex filter reduces to four real filters and two adders, corresponding to real filters 503, 504, 505, 506 and summing nodes 507 and 508 in FIG. 23. However, the preferred implementation of a general complex filter as shown in FIG. 23 has separate filter sections for poles and zeros of each real filter. In this case, the filter sections 503 and 506 on the real and complex signal paths provide real zeros, and the filter sections 504 and 505 cross-coupling the real and complex signal paths provide imaginary zeros. Filter sections 511 and 514 on the real and imaginary signal paths provide real poles and common zeros. Filter sections 512 and 513 cross-coupling the real and imaginary signal paths through summing nodes 509 and 510 provide imaginary poles. The real and imaginary signal paths from the filter sections 511 and 514 provide the in-phase demodulated signal (i) and the quadrature-phase demodulated signal (q), which are received by the I-channel filter 149 and the Q-channel filter 150 in FIG. 14.

For generating the nulling signal $v_n'$, the complex baseband signal is complex modulated to run it back up to the passband about the drive resonant frequency $f_o$. This is preferably accomplished through a set of four multipliers 515, 516, 517, and 518, and two summing nodes 519 and 520, that perform complex quadrature modulation to produce an in-phase modulated signal $I_{vN}$ and a quadrature-phase modulated signal $Q_{vN}$.

To stabilize the carrier servo feedback loop of the nulling signal $v_n$, phase shifting is done through two multipliers 521, 522, a summing node 523, and a complement unit 524 that multiplies by $+1$ or $-1$. The multiplier 521 multiplies the in-phase modulated signal $I_{vN}$ by $\cos\phi'$, and the multiplier 522 multiplies the quadrature-phase modulated signal $Q_{vN}$ by $\sin\phi'$, where $-\pi/2 \leq \phi' \leq +\pi/2$. The quadrature-phase modulated signal $Q_{vN}$ was produced by the complex quadrature modulation for use in the phase shifting technique employed by the specific circuit in FIG. 12. So that the angle $\phi'$ can be adjusted during operation of the angular rate sensor, the factor $\cos\phi'$ can be computed from the factor $\sin\phi'$ by a multiplier 525 that computes $u=(-\sin\phi')^2$, and a functional unit 526 that computes the square root of $(1-u)$. The functional unit 526 is similar to the functional unit 295 described above with reference to FIG. 17. The angle $\phi'$ could be adjusted during operation of the angular rate sensor, for example, as a predetermined function of temperature or the drive resonant frequency $f_o$ to compensate for variation in phase shift due to temperature variations.

Figure 29:
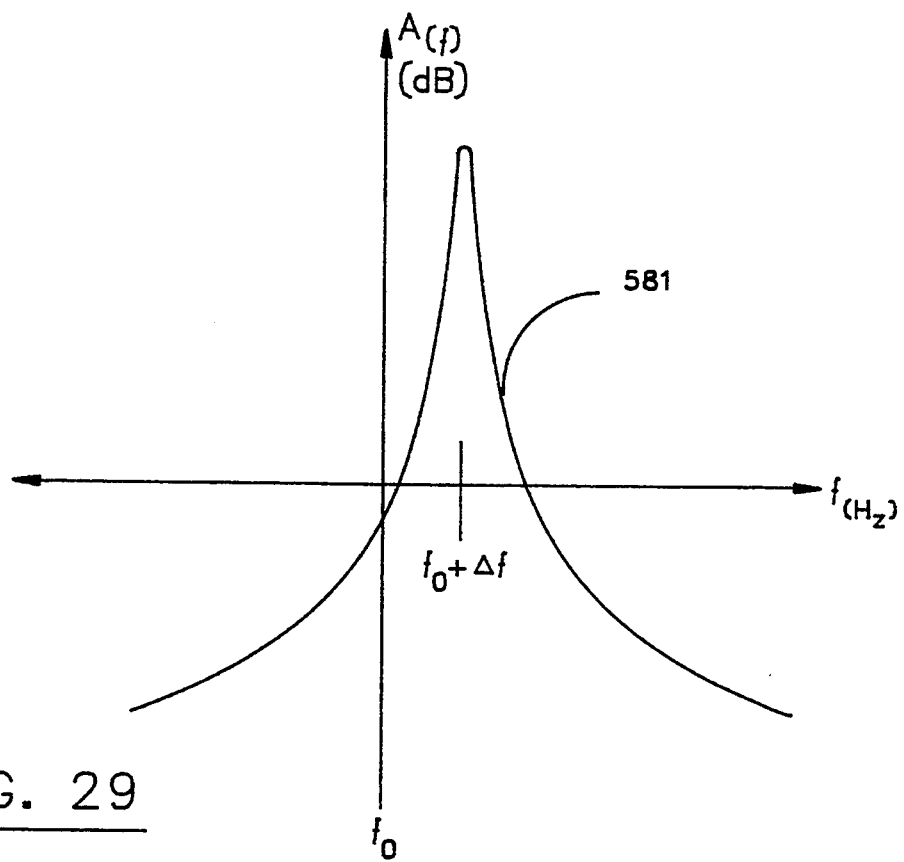
FIG. 29 shows an open-loop amplitude response for the angular rate sensing system of FIG. 14.

The precise location of the zeros and the poles are preferably determined by laboratory measurements on each individual instrument. The poles and zeros are computed from the measured open loop response, in order to equalize the response. Considerations in equalizing the response for an individual instrument will be further described below with reference to FIGS. 29 to 31.

Figure 24:
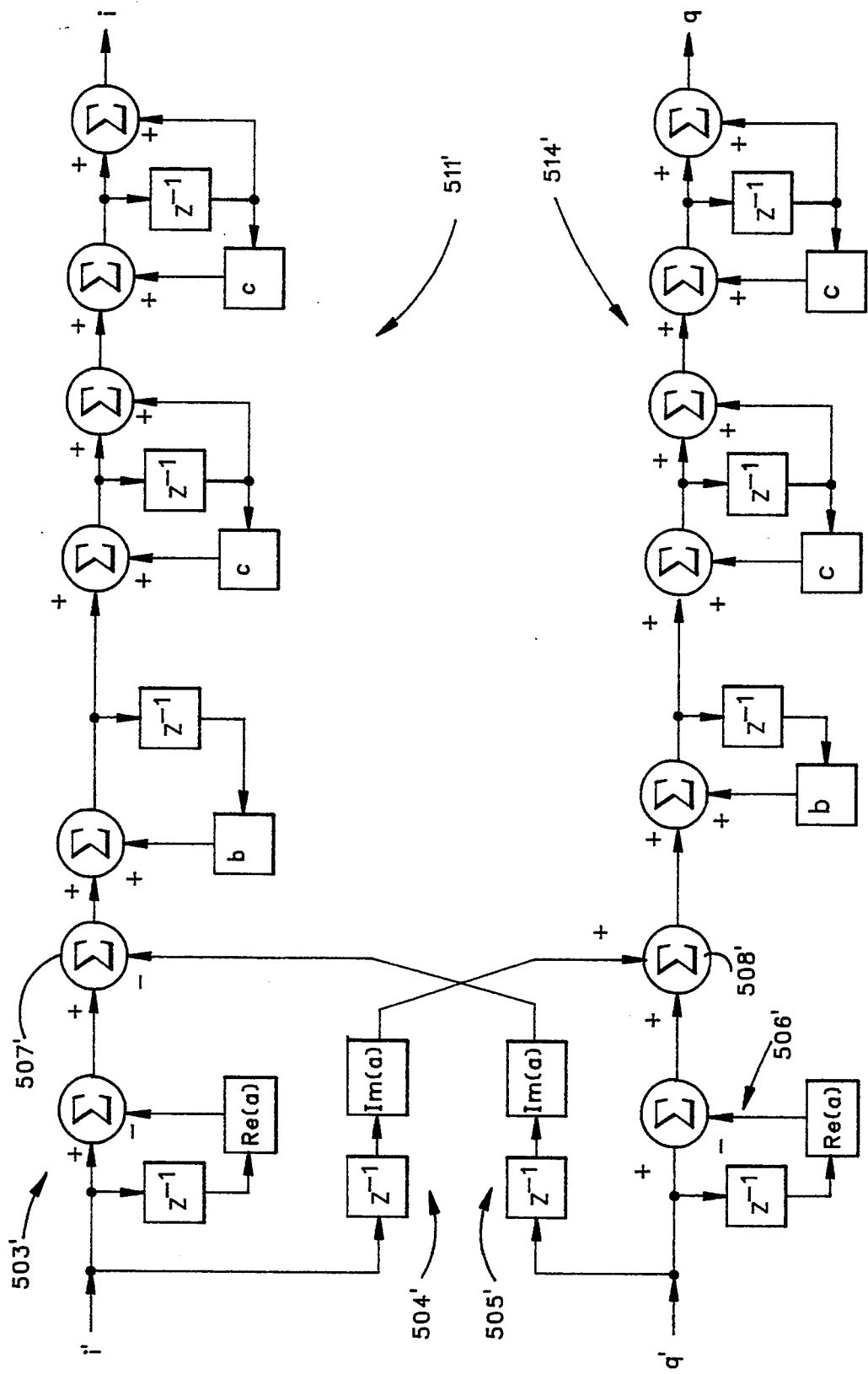
FIG. 24 is a specific embodiment of complex filtering used in the demodulator and servo-controller of FIG. 23.

A specific example of the complex filtering for an individual instrument is shown in FIG. 24. In this example, no imaginary poles were used in the complex filtering, and the values of four parameters were selected in order to equalize the response. Similar, but primed, reference numerals are used in FIG. 24 to denote corresponding components in FIG. 23. For a sampling frequency of 34.962 kHz, the values for the scale factors in the complex filtering of FIG. 24 are:

Re(a)=0.99995
Im(a)=0.00322
b=0.9998203014
c=0.9306370944

The above values were determined starting from a measured passband analog transfer function of the pick-off signal $v_d$. The measured passband analog transfer function was then determined to have a complex conjugate pole pair at $s=(-1\pm j8740)2\pi$, a complex conjugate zero pair at $s=(-3\pm j8760)2\pi$, and a repeated complex-conjugate pole set at $s=(-400\pm j8740)2\pi$. The drive fork resonant frequency during measurement of the passband analog transfer function was 8740 Hertz. Translated down to baseband, the transfer function has a real pole at $s=(-1)2\pi$, a real pole pair at $s=(-400)2\pi$, and a single complex zero at $s=(-3+j20)2\pi$. This transfer function at baseband was then converted to a digital transfer function by applying the matched-z transform.

In the matched-z transform, every pole and zero factor (real or complex) of a factored transfer function is treated in the same fashion. Each factor $(s+a)$ becomes $(1-e^{-aT}Z^{-1})/(1+Z^{-1})$, where T is the sampling period. Each complex-conjugate factor $[(s+a)^2+b^2]$ becomes $[1-2\cos(bT)e^{-aT}z^{-1}+e^{-2aT}Z^{-2}]/(1+z^{-1})^2$. Then all of the common $(1+z^{-1})$ factors cancelled.

By applying the matched-z transform to the above transfer function at baseband, the digital transfer function at baseband becomes:

$$[1-e^{(-3+j20)2\pi T_z-1}](1-z^{-1})^2/[1-e^{-2\pi T_z-1}][1-e^{(-400)2\pi T_z-1}]^2$$

For a sampling period $T=1/f_s$ where $f_s=34962$ Hertz, the digital transfer function at baseband becomes:

$$(1-az^{-1})(1+z^{-1})^2/(1-Bz^{-1})(1-Cz^{-1})^2$$

where
  $a=0.9998138431+j\ 0.0035936404$
  $b=0.9998203014$
  $c=0.9306370944$

These parameter values are the same as those used in the complex baseband filtering in FIG. 24, except that the actual value of (a) was changed to $0.99995+j\ 0.00322$ as a result of simple trial-and-error variation of (a) to do a better job of cancelling the complex-conjugate pole pair of the pick-up fork. The complex baseband digital filtering of FIG. 24 has zeros and poles that cancel the poles and zeros of the digital transfer function at baseband. The complex baseband digital filtering of FIG. 24 is also symmetrical with respect to the in-phase and quadrature-phase product signals i' and q', except that the summing node 507' has a minus sign on one of its inputs, and the summing node 508' does not have a minus sign on either of its inputs. The identical symmetry of the filter sections with respect to the in-phase and quadrature-phase product signals i' and q' is desirable in order to cancel even harmonic and product terms from the demodulator, which could fold into the bandwidth of the angular rate signal.

Listed in Appendix IV below is a computer program for implementing a demodulator and servo controller including the complex digital filtering of FIG. 24.

The lead/lag network of FIG. 20 is another example of a typical filter section that could be used to provide the poles and zeros in the complex filtering of FIG. 23, and in particular to provide stabilizing phase lead. The lead/lag network, for example, would be used for filter sections 511 and 514 in FIG. 23. The lead/lag network has one pole and one zero in its transfer function:

$$V_{OUT}=V_{IN}(Ls+\omega_o)/(s+L\omega_o).$$

The lead/lag network has low parameter sensitivity, which translates to short word length mechanizations that are very cost effective.

Figure 25:
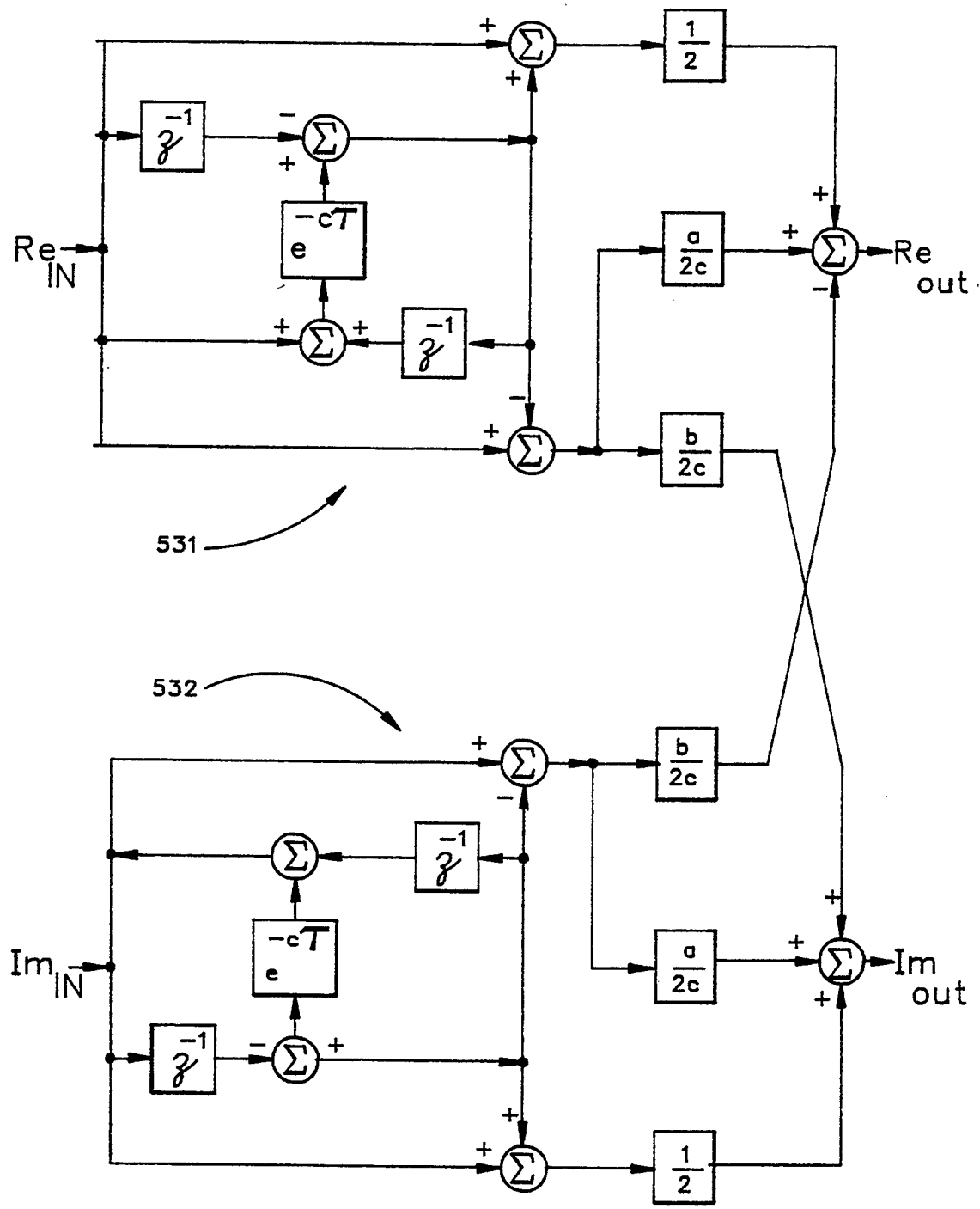
FIG. 25 is a schematic diagram of a digital filter employing a minimum sensitivity "lossless-bounded-real" (LBR) structure.

Turning to FIG. 25, there is shown a schematic diagram of two coupled "lossless-bounded-real" (LBR) filter sections 531 and 532 providing a single complex zero and a single real pole. These filter sections give a complex baseband realization of the transfer function $(s+a+jb)/(s+c)$. The coupled filter sections in FIG. 25 would be used for blocks 503, 504, 505, and 506 in FIG. 23.

Figure 26:
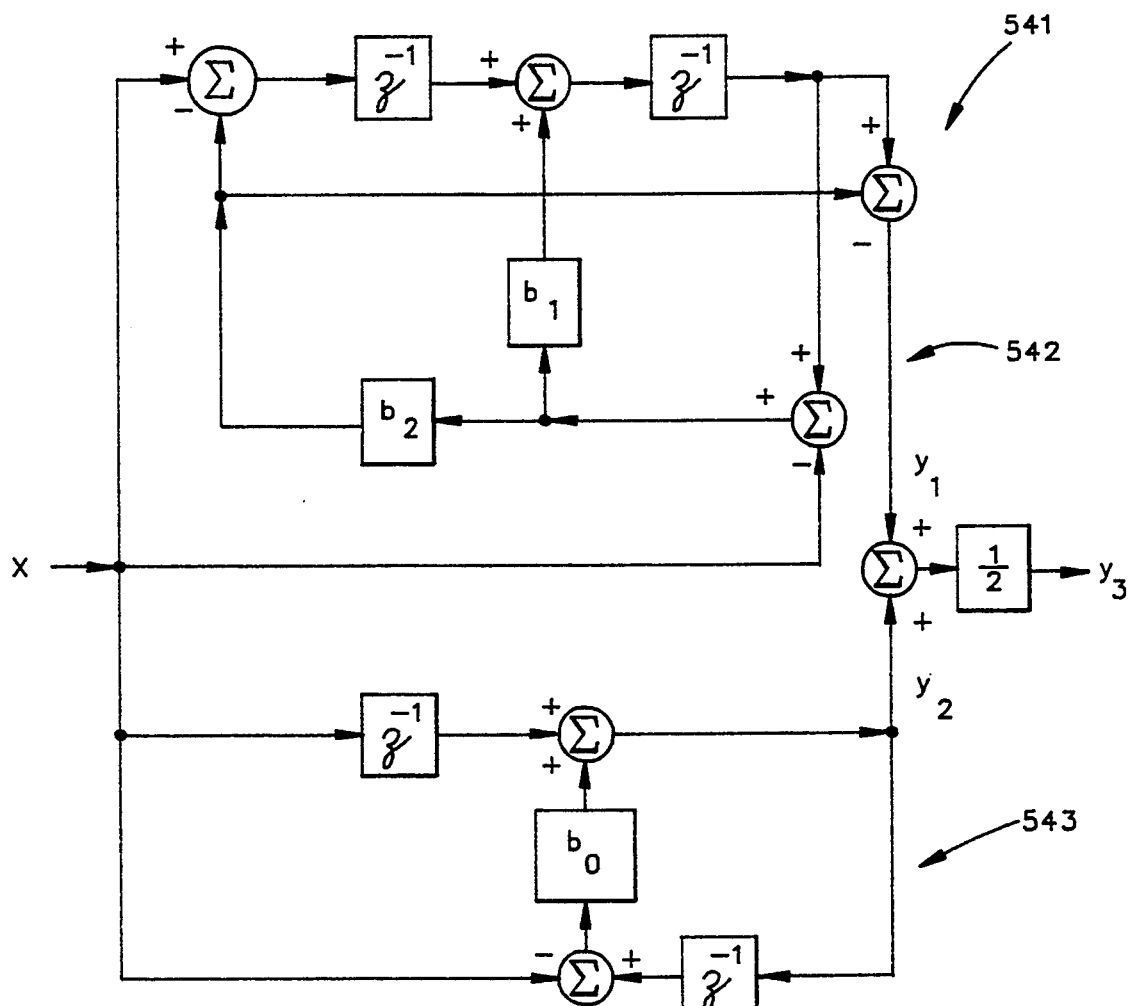
FIG. 26 is a schematic diagram of a third-order LBR noise filter.

Turning now to FIG. 26, there is shown a schematic diagram of a third order LBR filter section 541 having real poles and real zeros. This filter section would be used for filter sections 511 or 514 in FIG. 23. The filter section in FIG. 26 has an upper portion 542 having a transfer function of:

$$y_1/x=(z^{-2}-b_1z^{-1}+b_2)/(1-b_1z^{-1}+b_2z^{-2})$$

and a lower portion 543 having a transfer response of:

$$y_2/x=(z^{-1}-b_0)/(1-b_0z^{-1}).$$

The complex filtering of FIG. 23 may also use peaking filters and/or notch filters similar to the tracking filter of FIG. 15. The tracking filter of FIG. 15 is a peaking filter. For a notch or signal rejection filter, the two minus signs on the summing node 226 in FIG. 15 are changed to plus signs. For a notch frequency of $\omega_o$, a sampling period $T=1/f_s$, and a tuning parameter $\beta=\cos\omega_o T$, the notch filter has a transfer function of:

$$\frac{1}{2}\left[1+\frac{z^{-2}-\beta(1+\alpha)z^{-1}+\alpha}{1-\beta(1+\alpha)z^{-1}+\alpha z^{-2}}\right]$$

The peaking filters and/or notch filters would be used in blocks 511 and 514 in FIG. 23 to cancel any valleys or peaks in the closed loop response, as further described below with reference to FIG. 30.

Figure 27:
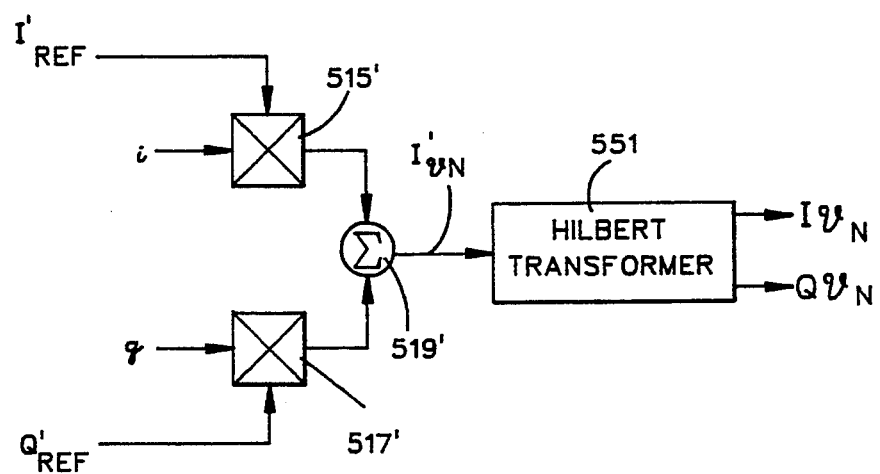
FIG. 27 is a complex quadrature modulator employing a Hilbert transformer.

FIG. 27 shows an alternative embodiment of circuitry for the complex modulator and phase shifter used in FIG. 23. As shown in FIG. 27, the complex modulator includes only two multipliers 515' and 517', and an adder 519', corresponding to the multipliers 515, 517 and the adder 519 in FIG. 23. The alternative circuitry of FIG. 27 replaces the multipliers 516, 518 and the adder 520 of FIG. 27 with a Hilbert transformer 551, which generates the in-phase modulated signal $I_{vN}$ and the quadrature-phase modulated signal $Q_{vN}$ from the signal $I'_{vN}$. In cases where the drive resonant frequency $f_o$ is relatively constant, or when only a small phase shift is needed from the phase shifter in FIG. 23, the Hilbert transformer 551 can be relatively simple.

Figure 28:
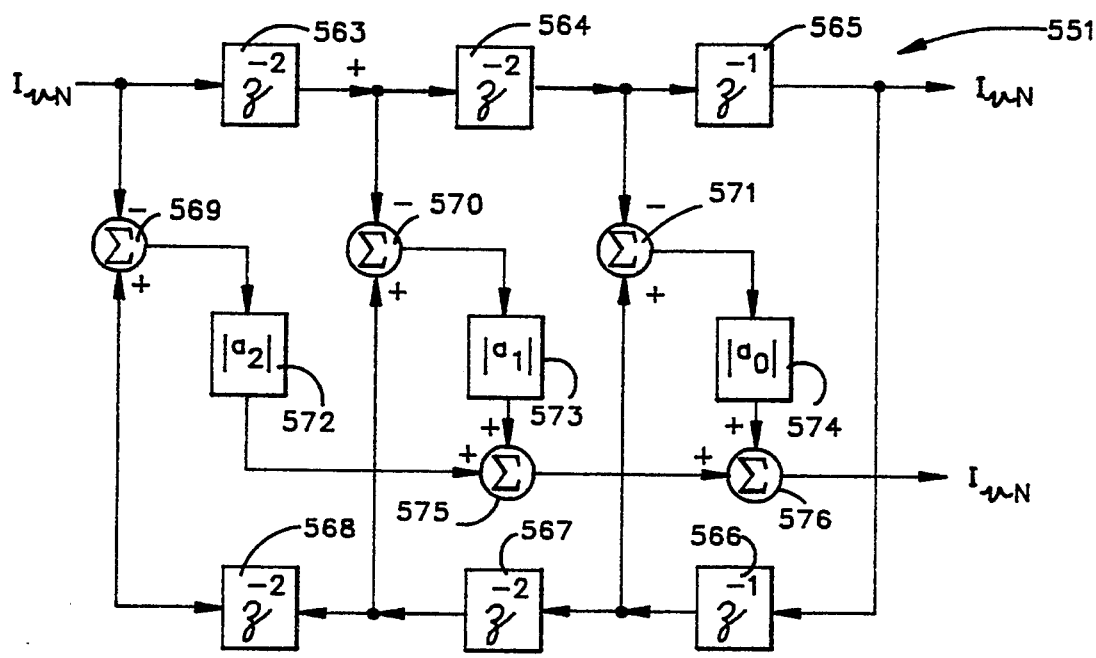
FIG. 28 is a schematic diagram for the Hilbert transformer used in FIG. 27.

Turning now to FIG. 28, there is shown a schematic diagram of the Hilbert transformer 551. The input signal $I'_{vN}$ is successively delayed by either two sample periods T or one sample period T by delay units 563–568. The delay units 563–564 and 567–568 each provide a delay of two sampling periods T, and the delay units 565, 566 each provide a delay of one sampling period T. The in-phase output $I_{vN}$ is produced by the output of the delay unit 565. The quadrature-phase output $Q_{vN}$ is a weighted sum of the input signal $v_{15}$ and the outputs of the delay units. In particular, subtractors 569, 570, 571 subtract respective ones of the input signal $I'_{vN}$ or the outputs of the delay units 563 and 564 from a respective one of the outputs of delay units 566–568. The differences are scaled by respective coefficients $a_0$–$a_2$ in respective scaling units 572, 573, 574. The outputs of the scaling units are summed together by adders 575 and 576 to produce the quadrature-phase modulated signal $Q_{vN}$. An appropriate set of coefficients for the Hilbert transformer 441 are as follows:
  $a_0'=0.5868816329$
  $a_1'=0.099083914$ $a_2' = 0.0122024482$ Turning now to FIG. 29, there is shown a graph of the open-loop amplitude response 581 of pick-up signal $v_r$ of the quartz rate sensor. This amplitude response peaks at the pick-up fork resonant frequency at $f_o + \Delta f$. As introduced above, the present invention uses complex filtering of a complex baseband signal for equalizing the response of the crystal rate sensor. The peaking of the response at the pick-up resonant frequency therefore occurs in the baseband signal at the relatively fixed frequency of $\Delta f$, and therefore equalization of the response over the desired bandwidth of the angular rate signal $\Omega$ (e.g, from $f_0 - 60$ Hz to $f_o + 60$ Hz) is more easily performed at baseband. Equalization by complex filtering at baseband further provides more freedom in shaping amplitude and phase so that a less distorted response is obtained over the desired bandwidth of the angular rate signal $\Omega$.

Figure 30:
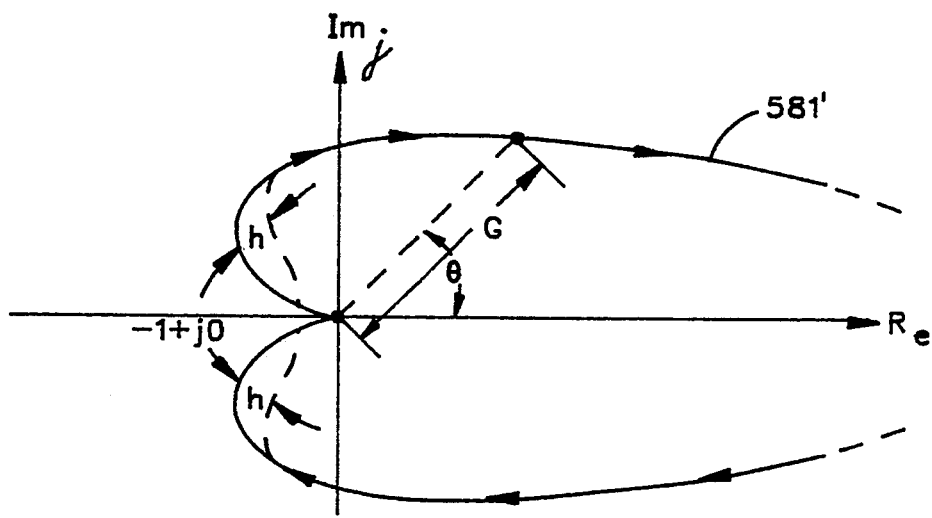
FIG. 30 shows a polar plot of the open-loop response of FIG. 29.

Turning now to FIG. 30, there is shown a gain-phase polar plot 581' of the open loop response for the equalized angular rate signal as a function of frequency. The vertical axis is an imaginary axis; the horizontal axis is a real axis. The frequency is not explicitly shown as a parameter on the plot 581', but there are arrows on the plot indicating the direction of increasing frequency as the frequency is increased from zero Hertz to infinity. Each point P on the plot 581' has a corresponding frequency, the radius to the point P from the origin $0 + j0$ has a distance equal to the amplitude or gain G at the corresponding frequency, and the angle $\theta$ of the radius to the point P is the phase shift at the corresponding frequency. At a frequency of zero Hertz, the gain is zero, corresponding to the origin of the plot 581. As the frequency is increased from zero, the gain increases, and the plot extends into the second quadrant. The gain further increases until the plot extends into the first quadrant, and continues off the figure, where a maximum occurs at about a phase angle of zero at the drive resonant frequency $f_o \Delta f$. As the frequency is increased further, the gain decreases, and the plot continues in the fourth quadrant, and then into the third quadrant. At very high frequencies, the gain approaches zero, and therefore the plot runs back to the origin.

Stability theory demands that the minus one point $(-1 + j0)$ not be encircled by the open-loop gain-phase plot 581'. Moreover, for a relatively flat closed-loop response, the plot 581' should always be displaced from the minus one point by a substantial phase and gain margin. The closeness of the open-loop response plot 581' to the minus one point determines how peaked the frequency response of the closed-loop system is. If the plot 581' comes very close to the $-1$ point, the closed-loop frequency response curve would have a huge peak and would be totally unsatisfactory. The complex filtering in FIG. 23 shapes the open-loop response plot 581' to obtain an acceptable closed-loop response. For example, the complex filtering of FIG. 23 may include the lead/lag filter of FIG. 20 in blocks 511 and 514 of FIG. 23 in order to shift the plot 581' by the distance h in FIG. 30 away from the minus one point to the position indicated by the dotted lines. The phase adjustment in the circuit of FIG. 23 further displaces the plot 581' from the minus one point by rotation of the entire plot by the phase adjustment angle $\phi' \pm 180°$ so that the minus one point is centered within the cusp of the plot.

In addition to compensating for the peaking at the pick-up resonant frequency $f_o + \Delta f$ and ensuring closed-loop stability, the complex filtering in FIG. 23 cancels or compensates for additional resonant modes in the fork structure itself. For any individual quartz rate sensor, the open-loop response will include a number of peaks and valleys. These peaks and valleys should be compensated by zeros and poles in the complex filtering, in order to obtain a relatively smooth closed-loop response.

Figure 31:
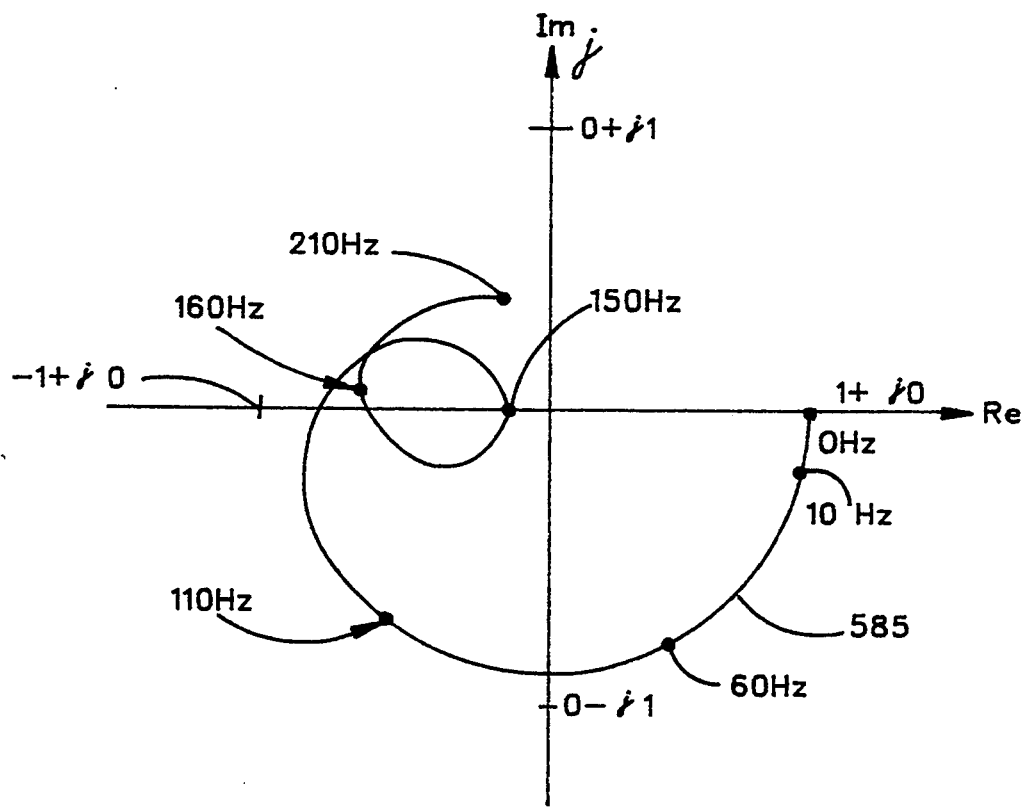
FIG. 31 shows a closed-loop response for the angular rate sensing system of FIG. 14.

Turning now to FIG. 31, there is shown a gain-phase plot 585 of a compensated closed-loop frequency response for the angular rate signal $\Omega$. The amplitude is relatively flat from about zero to 120 Hertz, falls off rapidly from about 120 to a first minimum at about 150 Hertz, and has a first side-lobe at about 160 Hz down by more than 3 dB.

In view of the above, there has been disclosed a complex demodulator and servo-controller for operating a quartz angular-rate sensor in a closed-loop mode including feedback of a nulling signal. The servo-controller includes a complex equalization filter that permits gain and phase to be equalized over the bandwidth of the demodulated angular rate signal. The complex equalization includes compensation for peaking at the drive fork resonant frequency, compensation for secondary modes of vibration of the drive fork, and phase lead compensation for a relatively flat frequency response over the bandwidth of the angular rate signal. Moreover, the servo-controller includes phase shifting by a phase adjustment signal to compensate for variable delay or phase shift through the feedback loop.

The specific embodiment can be modified in various ways without departing from the scope of the invention as defined by the appended claims. For use with quartz angular rate sensors, for example, the drive circuits and the circuits producing the in-phase and quadrature-phase reference signals can be constructed in various ways, for example, to use conventional analog drive circuits, or to save cost at the expense of limited performance. These alternative circuits are disclosed in the above-cited related applications. The related application entitled "Complex Digital Demodulator Employing Chebychev-Approximation Derived Synthetic Sinusoid Generation," shows how to generate in-phase and quadrature-phase reference signals from a conventional analog driver circuit. The related application entitled "Tracking Filter and Quadrature-Phase Reference Generator," shows how to use a Hilbert transformer for generating the in-phase and quadrature-phase reference signals. The related application entitled "Frequency and Phase-Locked Two-Phase Digital Synthesizer," shows alternate constructions for a phase-locked oscillator for generating the in-phase and quadrature-phase reference signals.

APPENDIX I
MATHCAD (TRADEMARK) PROGRAM
DIGITAL BASEBAND EQUALIZER
QRSDBEQUAL.MCS

INITIALIZATION $f_s := 32000$     Sampling frequency in Hz.
$f_{max} := 1000$   Maximum frequency for display.

-continued

APPENDIX I
MATHCAD (TRADEMARK) PROGRAM
DIGITAL BASEBAND EQUALIZER
QRSDBEQUAL.MCS

| | |
|---|---|
| $f_x := 100$ | Crossover frequency in Hz. |
| $\Phi_{max} := 45$ | Phase lead in degrees at crossover. |
| | SETUP |
| $T := \dfrac{1}{f_s}$ | Sampling period in seconds. |
| $I := 1000$ | Number of frequency samples. |
| $i := 0 \ldots I - 1$ | Frequency index. |
| $f_i := -f_{max} + \dfrac{i}{I-1} \cdot 2 \cdot f_{max}$ | The analysis frequencies in Hz. |
| $\rho := \dfrac{180}{\pi}$ | Radians-to-degrees conversion factor. |
| $L := \dfrac{1 + \sin\left[\dfrac{\Phi_{max}}{\rho}\right]}{\cos\left[\dfrac{\Phi_{max}}{\rho}\right]}$ | A design parameter |
| $j := \sqrt{-1}$ | |
| $s := 2 \cdot \Pi \cdot j \cdot f$ | The Laplace variable in steady state. |
| $z := \overline{\exp(s \cdot T)}$ | The discrete-time variable in steady state. |
| $F := \overline{\left[\dfrac{L \cdot s + 2 \cdot \pi \cdot f_x}{s + 2 \cdot \pi \cdot f_x \cdot L}\right]}$ | The continous-time transfer function of the basebanded equalizer. |
| $A := 1 - 2 \cdot \pi \cdot f_x \cdot L \cdot T$ | A shorthand parameter. |
| $G := \overline{\left[\dfrac{A - z^{-1}}{[1 - A \cdot z^{-1}]}\right]}$ | A first-order discrete-time all-pass filter. |
| $H := \dfrac{L}{2} \cdot (1 + G) + \dfrac{1}{2 \cdot L} \cdot (1 - G)$ | The discrete-time transfer function of the basebanded equalizer. |
| $E := F - H$ | The error transfer function. |
| $HdB := 20 \cdot \overline{\log(|H|)}$ | The magnitude frequency response in dB of the discrete-time transfer function of the basebanded equalizer. |
| $\theta := \rho \cdot \overline{\arg(H)}$ | The phase frequency response in degrees of the discrete-time transfer function of the basebanded equalizer. |
| $\phi := \rho \cdot \overline{(\arg(F) - \arg(H))}$ | The phase frequency response in degrees of the error transfer function. |

| | | |
|---|---|---|
| $[\overline{(|H|)}]$ | = | 2.346 |
| $[\overline{(|H|)}]$ | = | 0.414 |
| $\max(HdB)$ | = | 7.407 |
| $\min(HdB)$ | = | −7.653 |

END OF PROGRAM

APPENDIX II
MATHCAD (Trademark) PROGRAM
CHEBYCHEV II BASEBAND LOWPASS NOISE FILTER DESIGN PROGRAM
QRSBBNOISE.MCD
SETUP

| | |
|---|---|
| Enter the passband edge frequency (Hz) | $f_{pb} := 400$ |
| Enter the stopband edge frequency (Hz) | $f_{sb} := 2500$ |
| Enter the minimum passband gain (dB) | $A_{pb} := -3$ |
| Enter the maximum stopband gain (dB) | $A_{sb} := -60$ |
| The frequency response analysis extends from f.min Hz to f.max Hz, where | $f_{min} := 100$ |
| | $f_{max} := 10000$ |
| Since we will be using a sampled-data realization, enter the sampling frequency in Hz. | $f_s := 34762$ |

COMPUTE SOME PARAMETERS

There are certain auxiliary variables that we will use:

$T := \frac{1}{f_s}$     $T = 2.877 \; 10^{-5}$ ... the sampling period in sec.

$A_1 := 10^{\frac{A_{pb}}{20}}$     $A_1 = 0.708$ ... peak passband amplitude response deviation from unity.

$A_2 := 10^{\frac{A_{sb}}{20}}$     $A_2 = 0.001$ ... peak stopband amplitude response deviation from zero.

$\omega_{pb} := \frac{2}{T} \cdot \tan\left[\pi \cdot \frac{f_{pb}}{f_s}\right]$     $\omega_{pb} = 2514.369$ ... prewarped passband edge frequency in rad/sec.

$\omega_{sb} := \frac{2}{T} \cdot \tan\left[\pi \cdot \frac{f_{sb}}{f_s}\right]$     $\omega_{sb} = 15980.817$ ... prewarped stopband edge frequency in rad/sec.

$\Omega_s := \left[\frac{\omega_{sb}}{\omega_{pb}}\right]$     $\Omega_s = 6.356$ ... normalized transition ratio.

$\epsilon := \sqrt{A_1^{-2} - 1}$     $\epsilon = 0.998$ ... a useful parameter related to peak passband amplitude-response deviation from unity.

$g := \sqrt{A_2^{-2} - 1}$     $g = 999.999$ ... another useful parameter related to peak stopband amplitude-response deviation from zero.

$N := \text{ceil}\left[\frac{\text{acosh}\left[\frac{g}{\epsilon}\right]}{\text{acosh}[\Omega_s]}\right]$     $N = 3$ ... number of poles required of any Chebyshev filter.

$M := 2 \cdot \text{floor}\left[\frac{N}{2}\right]$     $M = 2$ ... number of zeros required of a continuous-time Chebyshev II filter.

FOR FREQUENCY-RESPONSE TESTS

We can plot the frequency responses of our filter from f.min Hz. to f.max Hz. We need to define a frequency index:

$K := 100$     ... total number of analysis points.

$k := 0 \ldots K - 1$     ... frequency index.

$f_k := f_{min} \cdot \left[\frac{f_{max}}{f_{min}}\right]^{\frac{k}{K-1}}$     ... a logarithmic distribution of the analysis frequencies in Hz.

$\omega := 2 \cdot \Pi \cdot f$     ... the analysis frequencies in rad/sec.

$s := j \cdot \omega$     ... the continuous-time variable.

$z := \overline{[e^{s \cdot T}]}$     ... the discrete-time variable.

Now we can evaluate the amplitude and phase frequency responses. We also display the z-plane distribution of the poles and zeros. Define:

$\rho := \frac{180}{\pi}$     ... radians-to-degrees conversion factor.

$\theta_k := \exp\left[2 \cdot \pi \cdot j \cdot \frac{k}{K}\right]$     ... needed for drawing the unit circle.

CHEBYCHEV II FILTER DESIGN

The pole indices are $n := 0 \ldots N-1$ and we define a convenient angle parameter $$u_n := (2 \cdot n + 1) \cdot \left[ \frac{\pi}{2 \cdot N} \right]$$

Now we compute the auxiliary parameter, v, the vector, w, and set up the zero-counting index, m:

$$m := 0 \ldots M - 1$$

$$w_m := u$$

$$v := \left[ \frac{-1}{N} \right] \cdot \text{asinh}(g)$$

$$m + (\text{mod}(N, 2) \approx 1) \cdot \left[ m \geqq \text{floor}\left[\frac{N}{2}\right] \right]$$

All frequencies used in the design of a Chebychev II filter are normalized to the stopband-edge frequency. The prewarped s-plane poles and zeros of the Chebyshev II filter are located, respectively, at:

$$sp := j \cdot \left[ \frac{-\omega_{sb}}{\cos(u + j \cdot v)} \right] \qquad sz := \left[ \frac{j \cdot \omega_{sb}}{\cos(w)} \right]$$

We shall use the bilinear z transformation; therefore, the z-plane poles and zeros are, respectively $$P := \left[ \frac{2 + sp \cdot T}{2 - sp \cdot T} \right] \text{ and}$$

$$Z := \left[ \frac{2 + sz \cdot T}{2 - sz \cdot T} \right]; \; z_{N-1} := \text{if } [M \approx N, Z_{M-1}, -1]$$

The gain-normalizing constant is $$K_g := |n| \frac{1 - P_n}{1 - Z_n} \qquad K_g = 6.864 \; 10^{-4}$$

FILTER FREQUENCY-RESPONSE EVALUATION CALCULATIONS

| | |
|---|---|
| $R := \overline{\left[\left[\frac{2 \cdot \pi \cdot 400}{s + 2 \cdot \pi \cdot 400}\right]^2\right]}$ | ... 400 Hz double-pole noise filter is used as a reference. |
| $RL := \overline{(|R|)}$ | ... we'll plot its magnitude on a linear scale. |
| $RdB := 20 \cdot \overline{\log(RL)}$ | ... and in dB's. |
| $\phi := \rho \cdot \overline{\arg(R)}$ | ... and its phase in degrees. |
| $H := K_g \cdot \overline{\left[\overline{|n|}\left[\frac{1 - Z_n \cdot z^{-1}}{1 - P_n \cdot z^{-1}}\right]\right]}$ | ... complex frequency response of the Chebychev II noise filter. |
| ... of the Chebychev II noise filter. | |
| $\theta := \rho \cdot \overline{\left[ \sum_n [\arg[1 - Z_n \cdot z^{-1}] - \arg[1 - P_n \cdot z^{-1}]] \right]}$ | ... phase response of the filter, expressed in degrees. |
| $MH := \overline{(|H|)}$ | ... linear magnitude of the frequency response. |
| $HdB := 20 \cdot \overline{\log(MH)}$ | ... log of the magnitude of the frequency response expressed in dB. |

A brief editorial: There are many different ways that one may mechanize this filter, but in all cases the ideal frequency-response curves (amplitude, phase, group delay) are identical. Below the transfer function is given in first-order-factor form, cascaded biquadratic form, and "lossless-bounded-real" (LBR) form. The LBR form is the most trouble-free mechanization.

FILTER-PERFORMANCE PLOTS

The poles & zeros of the Chebychev II filter are $$P = \begin{bmatrix} 0.9627168352 & - & 0.0609211308j \\ & & 0.9291623326 \\ 0.9627168352 & + & 0.0609211308j \end{bmatrix}$$

$$Z = \begin{bmatrix} 0.8683770159 & + & 0.4959045859j \\ 0.8683770159 & - & 0.4959045859j \\ & & -1 \end{bmatrix}$$

We can put the transfer function in biquad form for C30 coding:

$$F(z) := K_g \cdot \left[ \frac{1 + z^{-1}}{1 - b_0 \cdot z^{-1}} \right] \cdot \left[ \frac{1 - a \cdot z^{-1} + z^{-2}}{1 - b_1 \cdot z^{-1} + b_2 \cdot z^{-2}} \right] \square$$

where $K_g = 6.864 \; 10^{-4}$ and $a := 2 \cdot Re[Z_0]$  $\quad a := 1.7367540317$ $b_0 := P_1$  $\quad b_0 = 0.9291623326$ $b_1 := 2 \cdot Re[P_0]$  $\quad b_1 = 1.9254336705$ $b_2 := [[[|P_0|]]]^2$  $\quad b_2 = 0.930535089$ The LBR realization (which does not require the multiplicative gain-scaling coefficient in front and which is the most robust realization) is $$G := \frac{1}{2} \cdot \left[ \frac{z^{-1} - b_0}{1 - b_0 \cdot z^{-1}} + \frac{z^{-2} - b_1 \cdot z^{-1} + b_2}{1 - b_1 \cdot z^{-1} + b_2 \cdot z^{-2}} \right]$$

One can easily demonstrate that the ideal realizations perform identically (nearly). Define:

$E := G - H$

END OF PROGRAM

---

APPENDIX III
MATHCAD (Trademark) PROGRAM
TRACKING FILTER DESIGN
QRSTRACK

INPUTS

$f_s := 2^{15}$ $f_2 = 3.277 \; 10^4$ — The sampling frequency in Hz.

$f_h := 500$ — The 3-dB-passband width of the filter in Hz.

$f_o := 10000$ — Tuning frequency of the filter. The actual adjustment if via parameter B.

$N := 1$ — Number of cascaded stages of filtering.

SETUP

$T := f_s^{-1}$ — Sampling period: $T = 3.052 \; 10^{-5}$ $\alpha := \dfrac{1 - \tan[0.5 \cdot \pi \cdot f_h \cdot T]}{1 + \tan[[0.5 \cdot \pi \cdot f_h \cdot T]]}$ — The passband-width parameter: $\alpha = 0.953$ $\beta := -\cos[2 \cdot \pi \cdot f_o \cdot T]$ — The tuning parameter: $\beta = 0.34$ $K := 100$  $k := 0 \ldots K - 1$ — The number of frequency-analysis points used in performance evaluation and the frequency-analysis index.

$f_k := \dfrac{f_s}{2} \cdot \dfrac{k + 1}{K}$ — The analysis frequencies.

$z := \overline{\exp(2j \cdot \pi \cdot f \cdot T)}$ — The discrete-time variable in steady state.

$G := \overline{\left[ \dfrac{z^{-2} + \beta \cdot (1 + \alpha) \cdot z^{-1} + \alpha}{1 + \beta \cdot (1 + \alpha) \cdot z^{-1} + \alpha \cdot z^{-2}} \right]}$ — The simplest second-order all-pass filter realizable by a Gray-Markel lattice structure.

$H := \overline{\left[ \left[ \dfrac{1}{2} \cdot (1 - G) \right]^N \right]}$ — A simple 2nd-order bandpass filter with unity passband gain, single-parameter tuning, single-parameter passband-width adjustment, and minimum coefficient sensitivity.

$HdB := 20 \cdot \overline{\log(H)}$ — Filter amplitude-frequency response expressed in dB.

---

What is claimed is:

1. A method of operating a servo-control system controlled by a control signal, said servo-control system producing a modulated signal responsive to said control signal, said modulated signal having a carrier frequency, said method comprising the steps of:
   a) measuring the open loop response of the system
   b) complex digital demodulating said modulated signal by said carrier frequency to produce an in-phase demodulated signal and a quadrature-phase demodulated signal;
   c) complex digital filtering said in-phase demodulated signal and said quadrature-phase demodulated signal to produce a filtered in-phase signal and a filtered quadrature-phase signal using scale factors computed from the open loop response measurement; and
   d) complex digital modulating said filtered in-phase signal and said filtered quadrature-phase signal by said carrier frequency to produce said control signal.

2. The method as claimed in claim 1, wherein said complex digital filtering includes cross-coupling of said in-phase demodulated signal and said quadrature-phase demodulated signal to produce said filtered in-phase signal and said filtered quadrature-phase signal.

3. The method as claimed in claim 2, wherein said cross-coupling produces imaginary zeros for said complex digital filtering.

4. The method as claimed in claim 1, wherein said complex digital filtering includes cross-coupling of said filtered in-phase signal and said filtered quadrature-phase signal to produce imaginary poles for said complex digital filtering.

5. The method as claimed in claim 1, wherein said complex digital filtering introduces phase lead for said filtered in-phase signal and said filtered quadrature-phase signal for frequencies where said control signal has an open-loop response close to a gain of one and a phase of −180 degrees.

6. The method as claimed in claim 1, wherein said complex digital filtering includes notch filtering at a frequency where said modulated signal is peaked.

7. The method as claimed in claim 1, wherein said complex digital filtering is symmetrical with respect to said in-phase demodulated signal and said quadrature-phase demodulated signal in order to cancel even harmonic and product terms from said complex digital demodulation.

8. The method as claimed in claim 1, wherein said method further includes adjusting phase of said control signal in response to a phase adjustment signal.

9. A sensor system comprising, in combination:
a sensor responsive to a control signal for producing a modulated signal having a carrier frequency;
a complex digital demodulator connected to said sensor for demodulating said modulated signal by said carrier frequency to produce an in-phase demodulated signal and a quadrature-phase demodulated signal;
a complex digital filter connected to said complex demodulator for filtering said in-phase demodulated signal and said quadrature-phase demodulated signal to produce an equalized in-phase signal and an equalized quadrature-phase signal wherein the filter has scale factors computed from an open loop response measurement of the sensor; and
a complex digital modulator connected to said complex digital filter and said sensor for modulating said equalized in-phase signal and said equalized quadrature-phase signal by said carrier frequency to produce said control signal.

10. The sensor system as claimed in claim 9, wherein said complex digital filter has complex zeros.

11. The sensor system as claimed in claim 9, wherein said complex digital filter has complex poles.

12. The sensor system as claimed in claim 9, wherein said complex digital filter includes a lead/lag network for introducing phase lead in said equalized in-phase signal and said equalized quadrature-phase signal at frequencies where said control signal has an open loop response close to a gain of one and a phase of $-180$ degrees.

13. The sensor system as claimed in claim 9, wherein said complex digital filter includes a notch filter for equalizing peaking in said modulated signal.

14. The sensor system as claimed in claim 9, further comprising a phase shifter connected between said complex digital modulator and said sensor for shifting phase of said control signal in response to a phase adjustment signal.

15. The sensor system as claimed in claim 14, wherein said phase shifter includes a Hilbert transformer.

16. A sensor system comprising, in combination:
(a) a sensor responsive to a control signal for producing a modulated signal having a carrier frequency;
(b) a complex digital demodulator connected to said sensor for demodulating said modulated signal by said carrier frequency to produce an in-phase demodulated signal and a quadrature-phase demodulated signal;
(c) a complex digital filter connected to said complex digital demodulator for filtering said in-phase demodulated signal and said quadrature phase demodulated signal to produce an equalized in-phase signal and an equalized quadrature-phase signal, wherein said complex digital filter includes:
(1) a first filter section connected to said complex digital demodulator for filtering said in-phase demodulated signal to produce a first filtered signal;
(2) a second filter section connected to said complex digital demodulator for filtering said in-phase demodulated signal to produce a second filtered signal;
(3) a third filter section connected to said complex digital demodulator for filtering said quadrature-phase signal to produce a third filtered signal;
(4) a fourth filter section connected to said complex digital demodulator for filtering said quadrature phase signal to produce a fourth filtered signal;
(5) a first summing node connected to said first filter section, said third filter section, and said complex digital modulator for combining said first filtered signal and said third filtered signal to produce a combined signal component of said equalized in-phase signal; and
(6) a second summing node connected to said second filter section, said fourth filter section, and said complex digital modulator for combining said second filtered signal and said fourth filtered signal to produce a combined signal component of said equalized quadrature-phase signal and wherein the complex digital filter has scale factors computed from an open loop response measurement of the sensor; and
(d) a complex digital modulator connected to said complex digital filter and said sensor for modulating said equalized in-phase signal and said equalized quadrature-phase signal by said carrier frequency to produce said control signal.

17. The sensor system as claimed in claim 16, wherein said complex digital filter further comprises:
a fifth filter section connected between said first summing node and said complex digital modulator for filtering said combined signal component of said equalized in-phase signal to produce said equalized in-phase signal; and a sixth filter section connected between said second summing node and said complex digital modulator for filtering said combined signal component of said equalized quadrature-phase signal to produce said equalized quadrature-phase signal.

18. The sensor system as claimed in claim 17, wherein said complex digital filter further comprises a seventh filter section connected to said fifth filter section for filtering said equalized in-phase signal to produce a filtered equalized in-phase signal; an eighth filter section connected to said sixth filter section for filtering said equalized quadrature-phase signal to produce a filtered equalized quadrature-phase signal; a third summing node connected to said first summing node, said fifth filter sections, and said eighth filter section for combining said combined signal component of said equalized in-phase signal with said filtered equalized quadrature-phase signal; and a fourth summing node connected to said second summing node, said fifth filter section, and said seventh filter section for combining said combined signal component of said equalized quadrature-phase signal with said filtered equalized in-phase signal.

19. A sensor system comprising, in combination:
(a) a sensor responsive to a control signal for producing a modulated signal having a carrier frequency;
(b) a complex digital demodulator connected to said sensor for demodulating said modulated signal by said carrier frequency to produce an in-phase demodulated signal and a quadrature-phase demodulated signal;
(c) a complex digital filter connected to said complex demodulator for filtering said in-phase demodulated signal and said quadrature phase demodulated signal to produce an equalized in-phase signal and an equalized quadrature-phase signal wherein the complex digital filter has scale factors computed from an open loop response measurement of the sensor;

(d) a complex digital modulator connected to said complex digital filter and said sensor for modulating said equalized in-phase signal and said equalized quadrature-phase signal by said carrier frequency to produce said control signal, wherein said complex digital modulator includes:

(1) a first multiplier connected to said complex digital filter for multiplying said equalized in-phase signal by an in-phase reference signal to produce a first product signal;

(2) a second multiplier connected to said complex digital filter for multiplying said equalized in-phase signal by a quadrature-phase reference signal to produce a second product signal;

(3) a third multiplier connected to said complex digital filter for multiplying said equalized quadrature-phase signal by said quadrature-phase reference signal to produce a third product signal;

(4) a fourth multiplier connected to said complex digital filter for multiplying said equalized quadrature-phase signal by said in-phase reference signal to produce a fourth product signal;

(5) a first summing node connected to said first multiplier and said third multiplier for combining said first product signal and said third product signal to produce an in-phase product signal; and (6) a second summing node connected to said second multiplier and said fourth multiplier for combining said second product signal and said fourth product signal to produce a quadrature-phase product signal; and (e) a phase shifter connected between said complex digital modulator and said sensor for shifting phase of said control signal in response to a phase adjustment signal, wherein said phase shifter includes:

(1) a fifth multiplier for multiplying said in-phase product signal by a first sinusoidal function of a phase shift angle to produce a first scaled product signal;

(2) a sixth multiplier for multiplying said quadrature-phase product signal by a second sinusoidal function of said phase shift angle to produce a second scaled product signal; and (3) a third summing node for combining said first scaled product signal and said second scaled product signal to produce said control signal.

20. The sensor system as claimed in claim 19, wherein said phase adjustment signal is one of said first and second sinusoidal functions, and said phase shifter includes a seventh multiplier for squaring said phase adjustment signal to produce a squared signal, and a computational unit connected to said seventh multiplier for computing approximately a square root of one minus said squared signal to produce another one of said first and second sinusoidal functions.

21. An angular-rate sensing system comprising, in combination:

an angular rate sensor having a drive signal input, a drive signal output, a nulling signal input, and a rate signal output; said angular rate sensor producing at said rate signal output an angular rate signal modulated on a carrier frequency when said drive signal input is excited at said carrier frequency; said angular rate sensor having a drive resonant frequency at which there is approximately zero phase shift from said drive signal input to said drive signal output; said angular rate sensor having pick-up resonant frequency offset from said drive resonant frequency;

a drive circuit connected to said drive signal input and said drive signal output for exciting said drive signal input at a drive frequency approximately equal to said drive resonant frequency;

a reference signal generator connected to said drive signal output for producing an in-phase reference signal and a quadrature-phase reference signal at said drive frequency;

a complex digital demodulator connected to said rate signal output and said reference signal generator for complex demodulation of said angular rate signal by said in-phase reference signal and said quadrature-phase reference signal to produce an in-phase demodulated signal and a quadrature-phase demodulated signal;

a complex digital filter connected to said complex digital demodulator for filtering said in-phase demodulated signal and said quadrature-phase demodulated signal to produce an equalized in-phase signal and an equalized quadrature-phase signal, said complex digital filter having zeros for compensating for said pick-up resonant frequency of said angular rate sensor wherein the complex digital filter has scale factors computed from an open loop response measurement of the sensor; and a complex digital modulator connected to said complex digital filter, said reference signal generator, and said nulling signal input for modulating said equalized in-phase signal and said equalized quadrature-phase signal to produce a nulling signal on said nulling signal input.

22. The angular-rate sensing system as claimed in claim 21, wherein said complex digital filter has complex zeros.

23. The angular-rate sensing system as claimed in claim 21, wherein said complex digital filter includes a lead/lag network for introducing phase lead in said equalized in-phase signal and said equalized quadrature-phase signal at frequencies where said nulling signal input has an open loop response close to a gain of one and a phase of $-180$ degrees.

24. The angular-rate sensing system as claimed in claim 21, further comprising means connected to said complex digital modulator and responsive to a phase adjustment signal for adjusting phase of said nulling signal.

25. The angular rate sensing system as claimed in claim 24, wherein said means includes a Hilbert transformer.

26. The angular rate sensing system as claimed in claim 21, further comprising an adjustable phase shifter connected between said complex digital modulator and said nulling signal input for adjusting phase of said nulling signal in response to a phase adjustment signal.

* * * * *